United States Patent
Choi et al.

(10) Patent No.: US 11,362,788 B2
(45) Date of Patent: Jun. 14, 2022

(54) METHOD FOR TRANSMITTING OR RECEIVING SOUNDING REFERENCE SIGNAL IN WIRELESS COMMUNICATION SYSTEM AND APPARATUS THEREFOR

(71) Applicant: LG ELECTRONICS INC., Seoul (KR)

(72) Inventors: Kukheon Choi, Seoul (KR); Jiwon Kang, Seoul (KR); Jonghyun Park, Seoul (KR); Kunii Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 16/964,521

(22) PCT Filed: Jan. 24, 2019

(86) PCT No.: PCT/KR2019/001027
§ 371 (c)(1),
(2) Date: Jul. 23, 2020

(87) PCT Pub. No.: WO2019/147045
PCT Pub. Date: Aug. 1, 2019

(65) Prior Publication Data
US 2021/0036825 A1 Feb. 4, 2021

Related U.S. Application Data

(60) Provisional application No. 62/621,580, filed on Jan. 24, 2018.

(51) Int. Cl.
*H04W 4/00* (2018.01)
*H04L 5/00* (2006.01)
*H04W 72/04* (2009.01)

(52) U.S. Cl.
CPC ......... *H04L 5/0048* (2013.01); *H04W 72/042* (2013.01); *H04W 72/0413* (2013.01)

(58) Field of Classification Search
None
See application file for complete search history.

(56) References Cited

U.S. PATENT DOCUMENTS

2013/0163536 A1\* 6/2013 Anderson ............ H04L 5/0037
370/329
2015/0043465 A1\* 2/2015 Ouchi ................... H04W 72/12
370/329
(Continued)

FOREIGN PATENT DOCUMENTS

KR 1020130132767 12/2013

OTHER PUBLICATIONS

PCT International Application No. PCT/KR2019/001027, International Search Report dated May 24, 2019, 4 pages.
(Continued)

*Primary Examiner* — Clemence S Han
(74) *Attorney, Agent, or Firm* — Lee Hong Degerman Kang Waimey

(57) ABSTRACT

The present invention provides a method for transmitting or receiving a sounding reference signal in a wireless communication system and an apparatus therefor. Specifically, a method for transmitting a sounding reference signal (SRS) by a terminal in a wireless communication system may comprise the steps of: receiving, from a base station, configuration information for transmission of the SRS, wherein the configuration information includes one or more SRS resources for transmission of the SRS, a cyclic shift (CS) hopping pattern for the SRS, and CS relation information about whether CS hopping patterns of the SRS and a PUCCH are related; and transmitting the SRS to the base station, through at least one SRS resource among the one or (Continued)

more SRS resources, wherein a CS value applied to the SRS is configured on the basis of the CS hopping pattern for the SRS and the CS relation information.

12 Claims, 18 Drawing Sheets

(56) References Cited

U.S. PATENT DOCUMENTS

| | | | | |
|---|---|---|---|---|
| 2015/0304994 A1* | 10/2015 | Kim | ................... | H04W 72/042 370/280 |
| 2020/0336973 A1* | 10/2020 | Niu | ...................... | H04L 5/0094 |

OTHER PUBLICATIONS

Huawei, et al., "Summary of remaining details of SRS design", R1-1800090, 3GPP TSG RAN WG1 Ad hoc Meeting, Jan. 2018, 12 pages.
Oppo, "Text proposal for SRS", R1-1800485, 3GPP TSG RAN WG1 Meeting AH 1801, Jan. 2018, 10 pages.
NTT Docomo, Inc, "Discussions on NR SRS Design", R1-1720810, 3GPP TSG RAN WG1 Meeting 91, Dec. 2017, 10 pages.
Mitsubishi Electric, "Views on SRS designs", R1-1719519, 3GPP TSG RAN WG1 #91, Dec. 2017, 7 pages.

* cited by examiner

【FIG. 1】
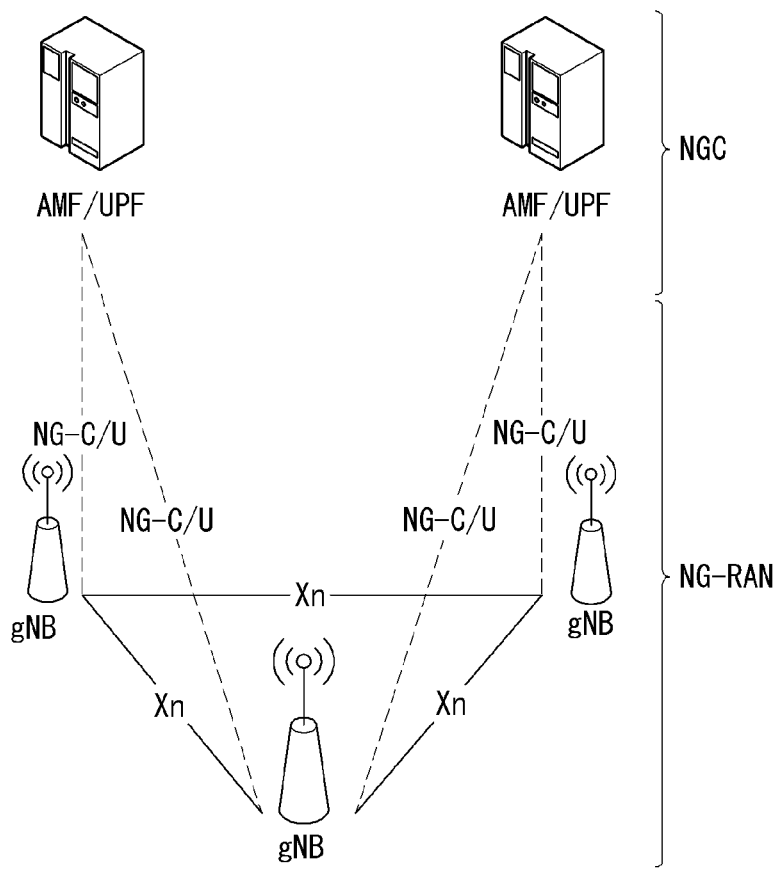
【FIG. 2】
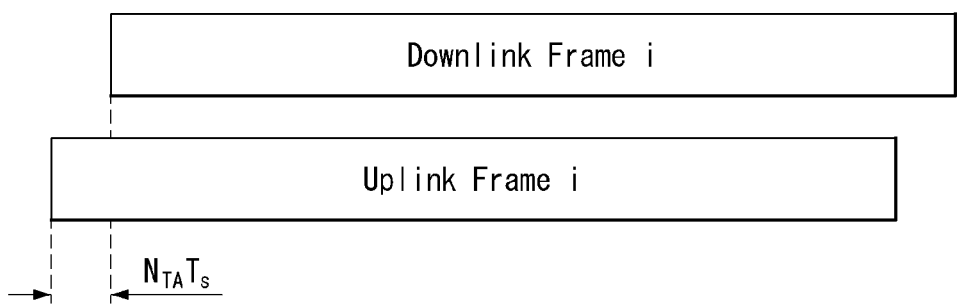

[FIG. 3]
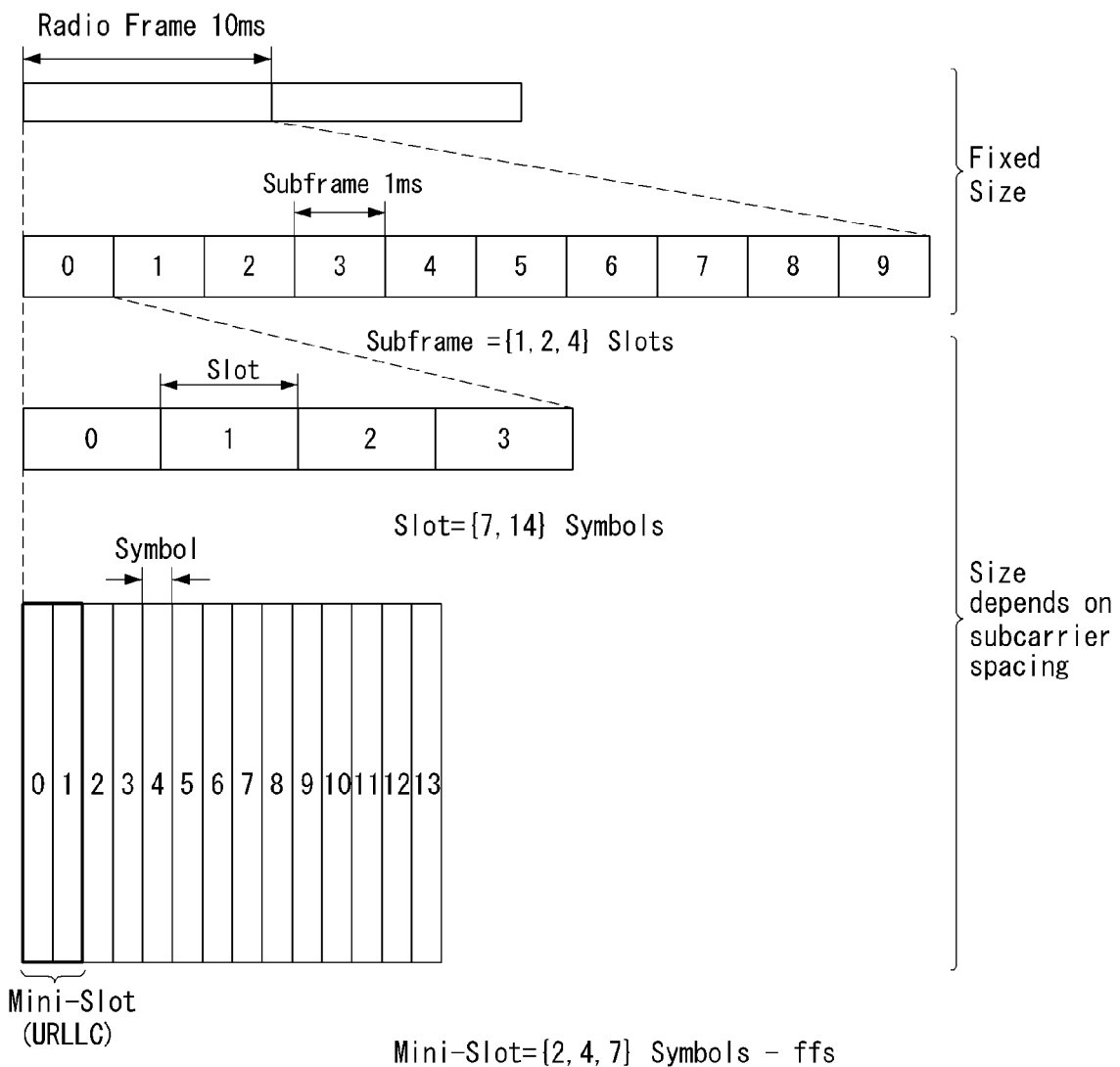

[FIG. 4]
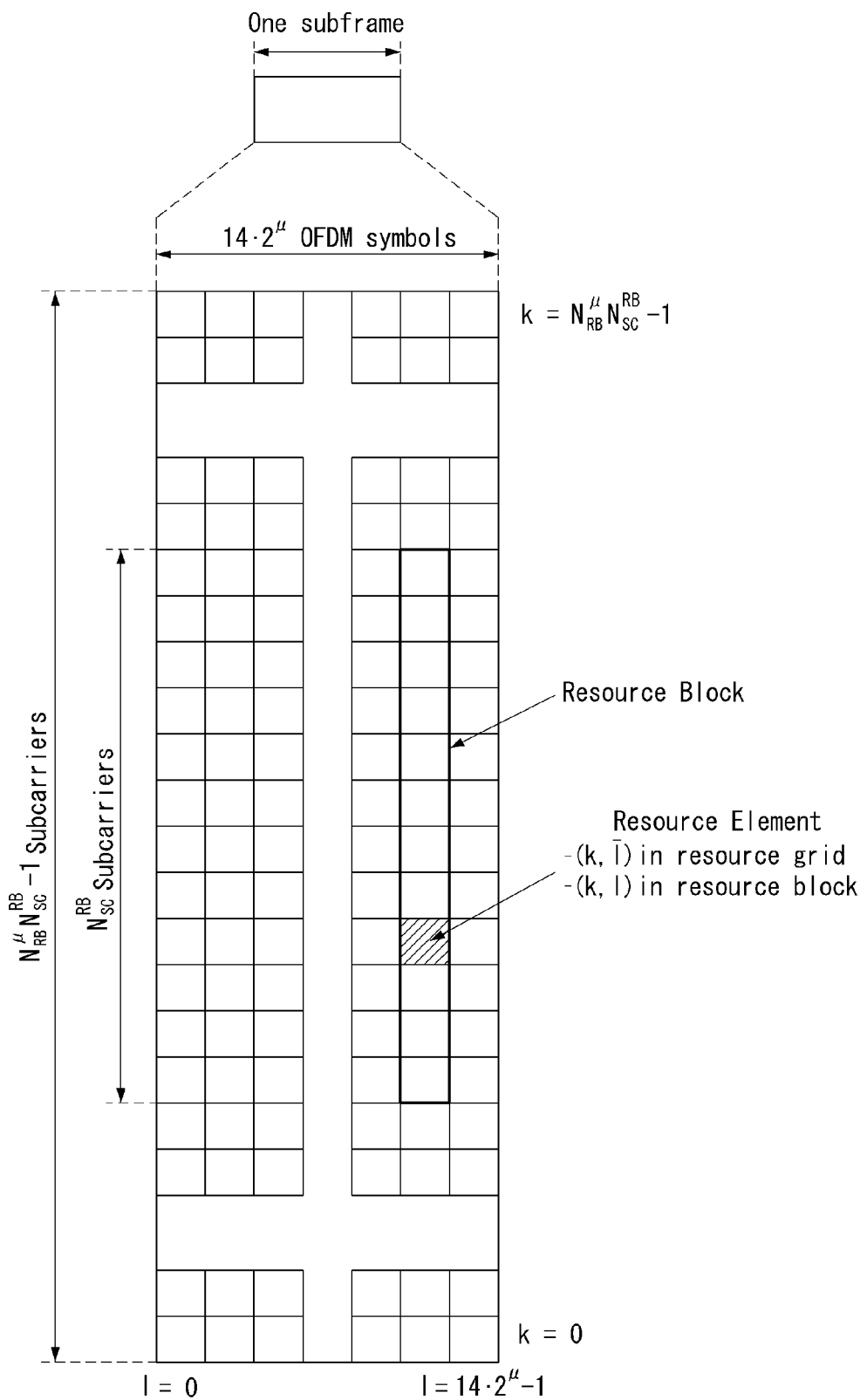

[FIG. 5]
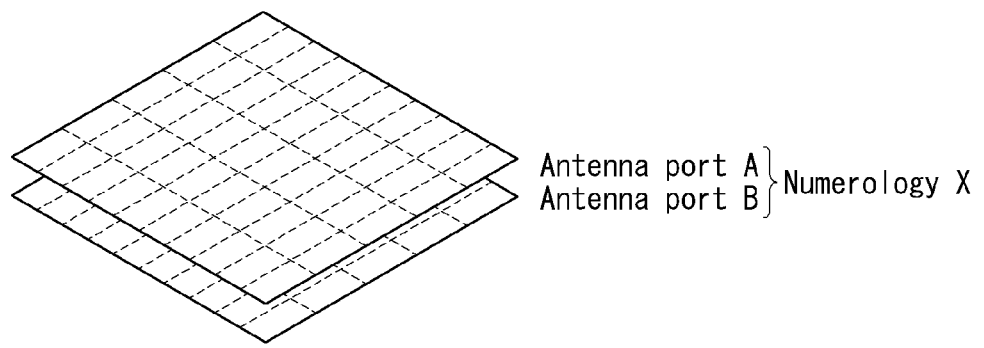
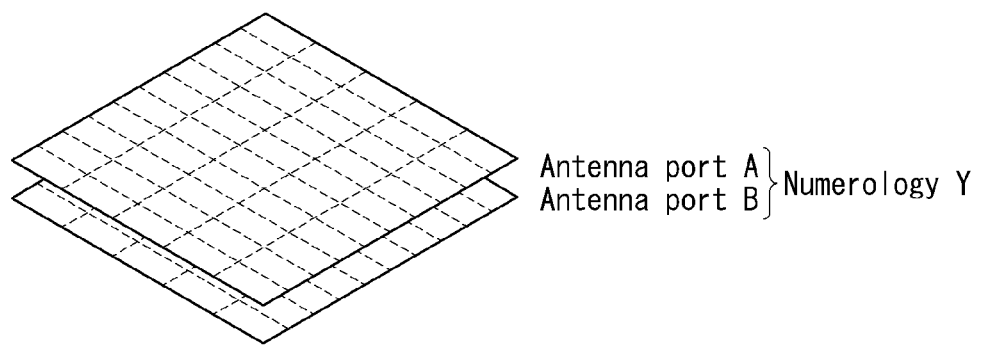

[FIG. 6]
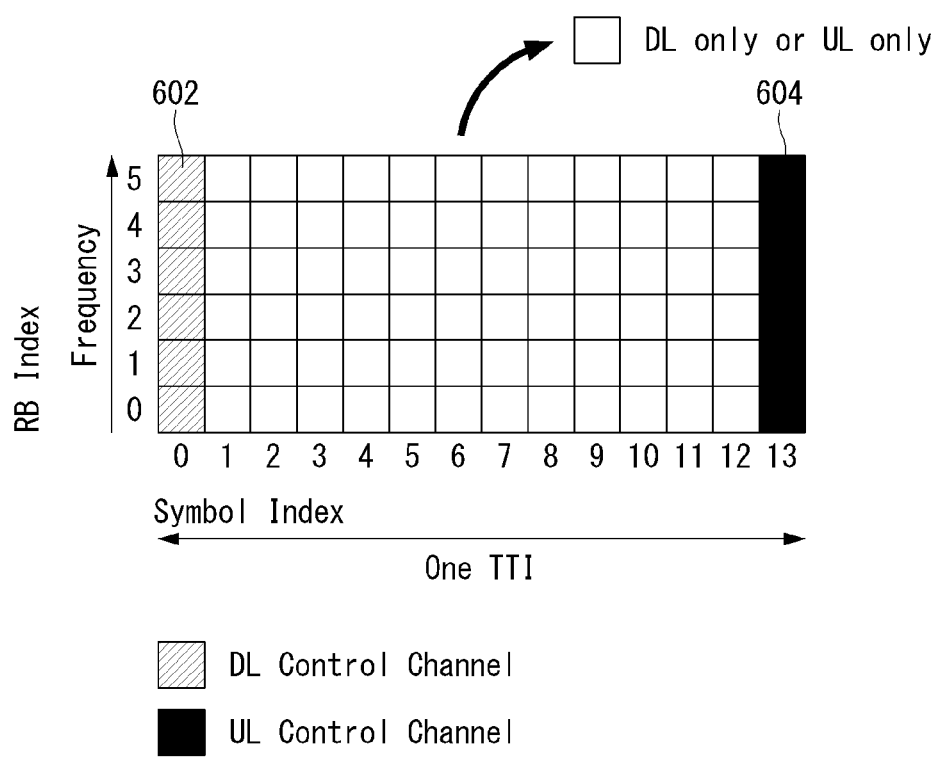

[FIG. 7]
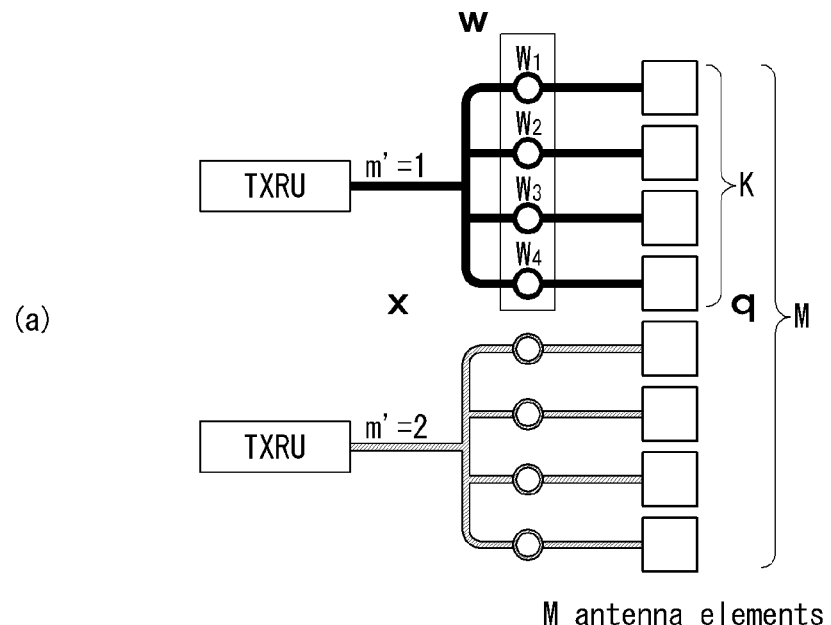
(a)
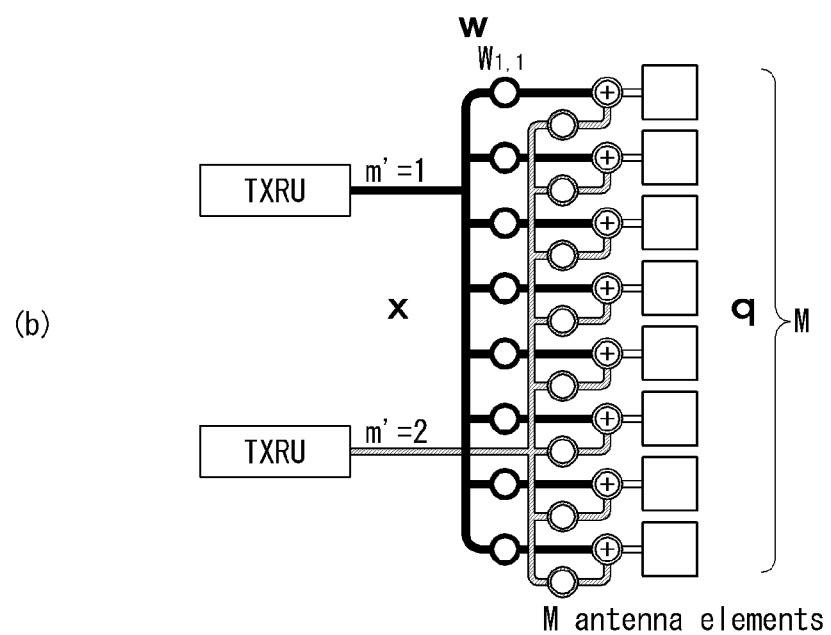
(b)

[FIG. 8]
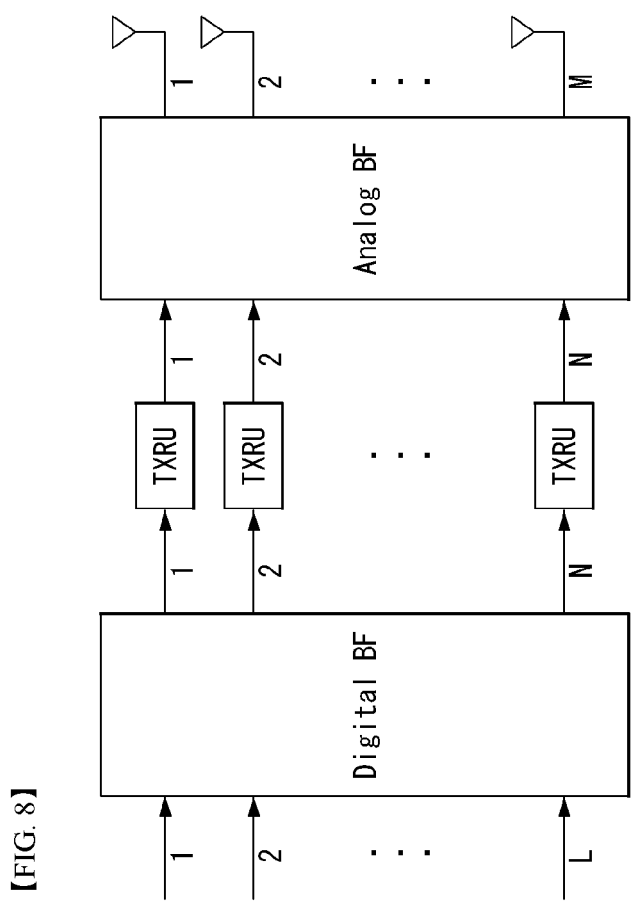

[FIG. 9]
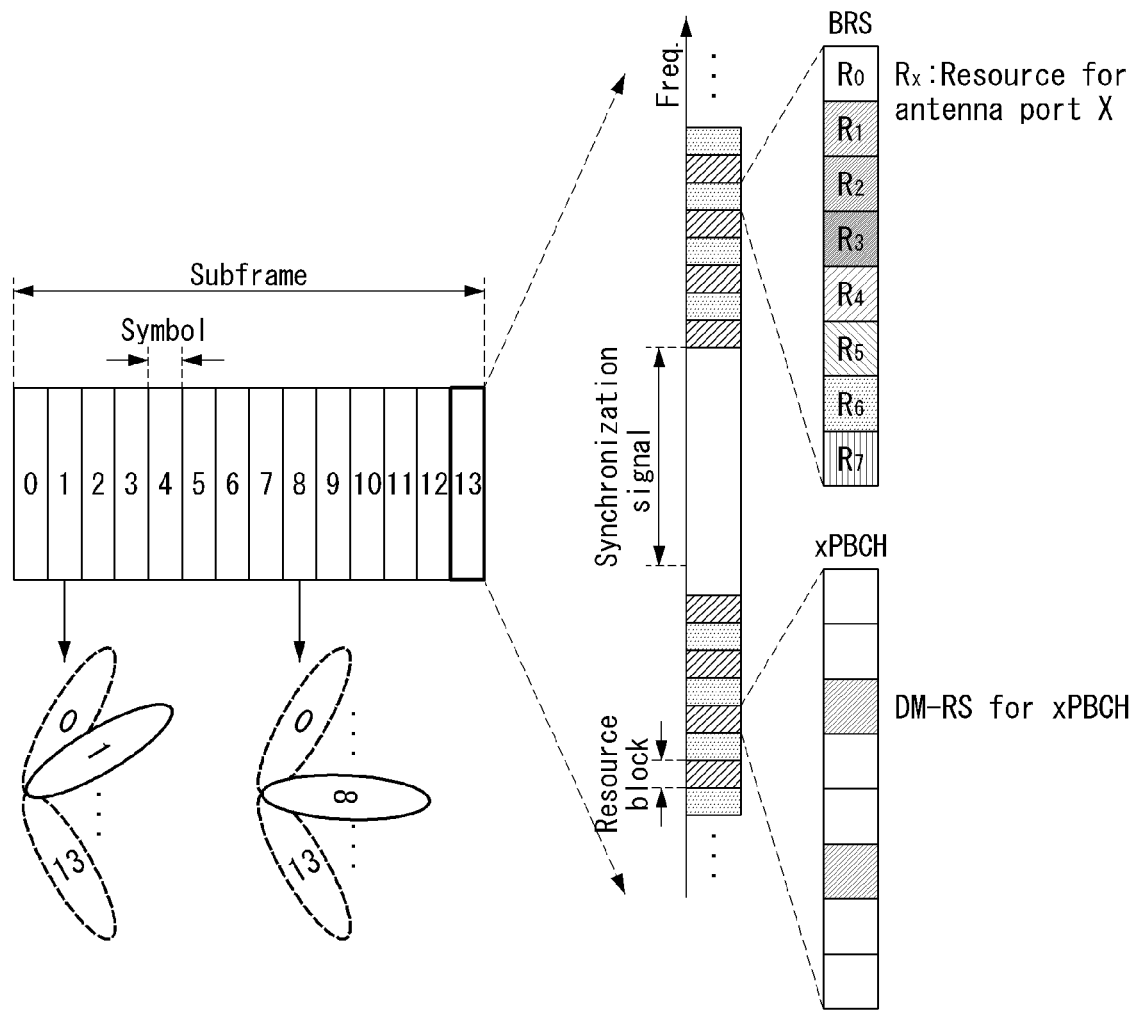

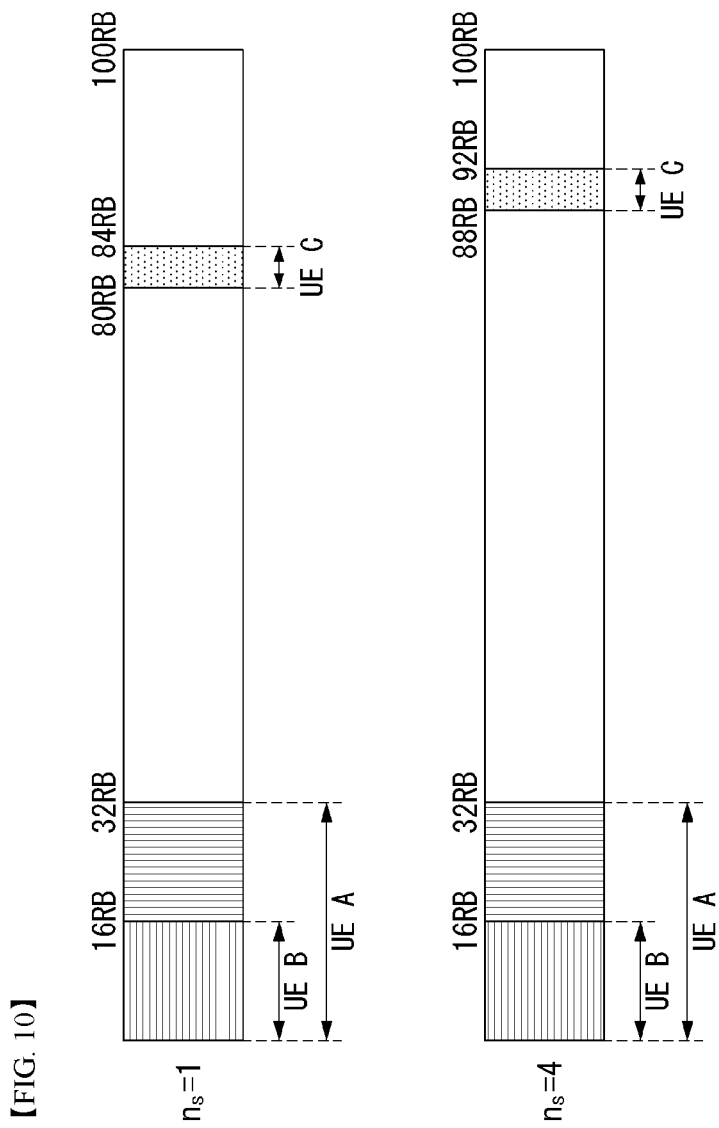
[FIG. 10]

[FIG. 11]
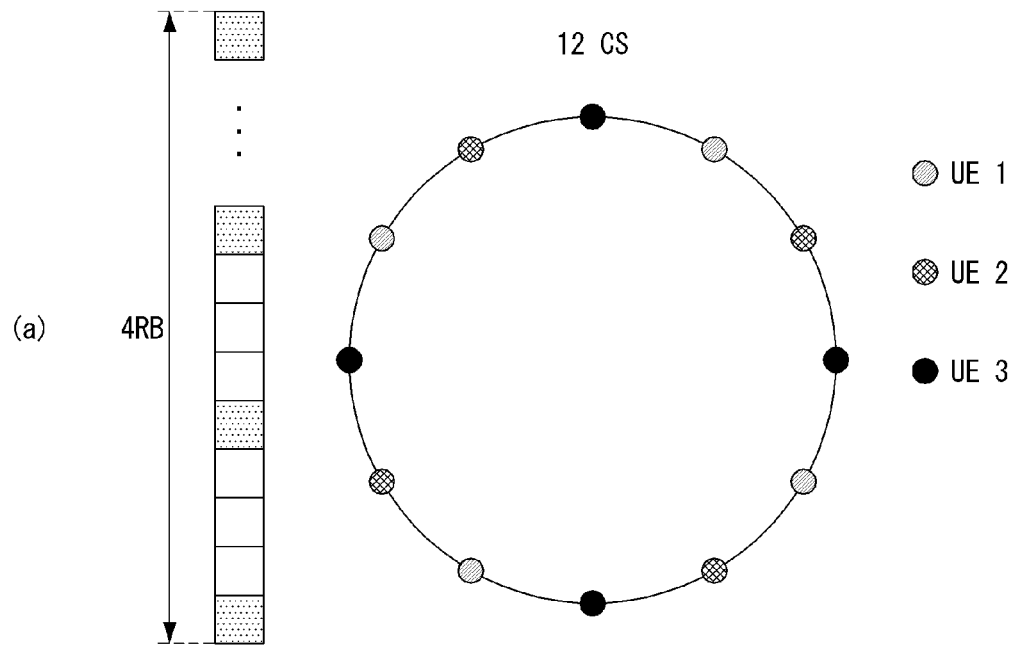
(a)
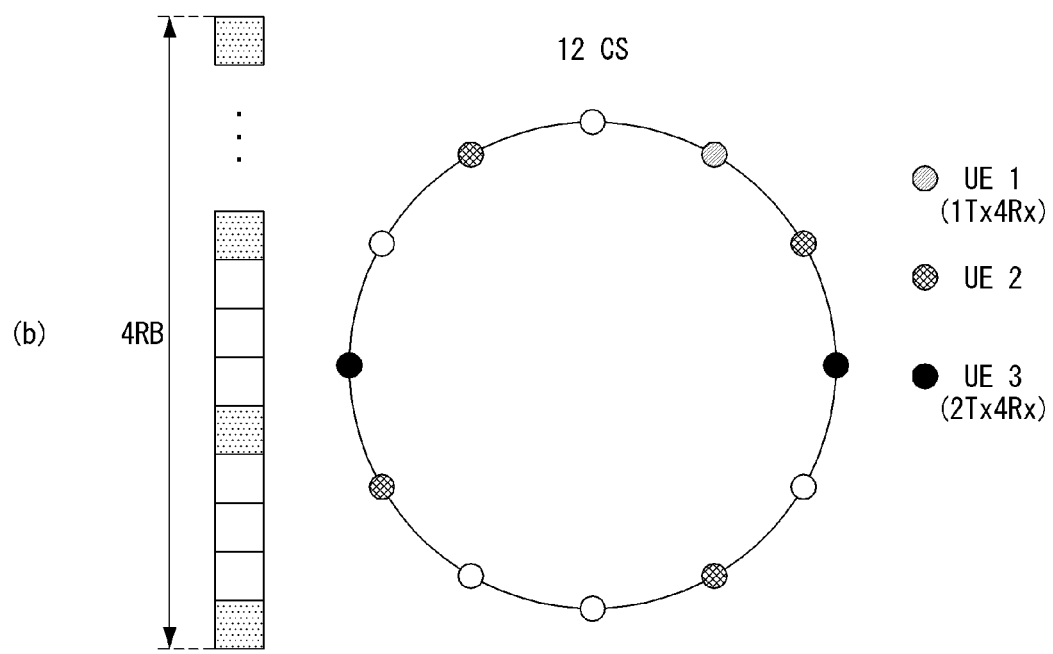
(b)

[FIG. 12]
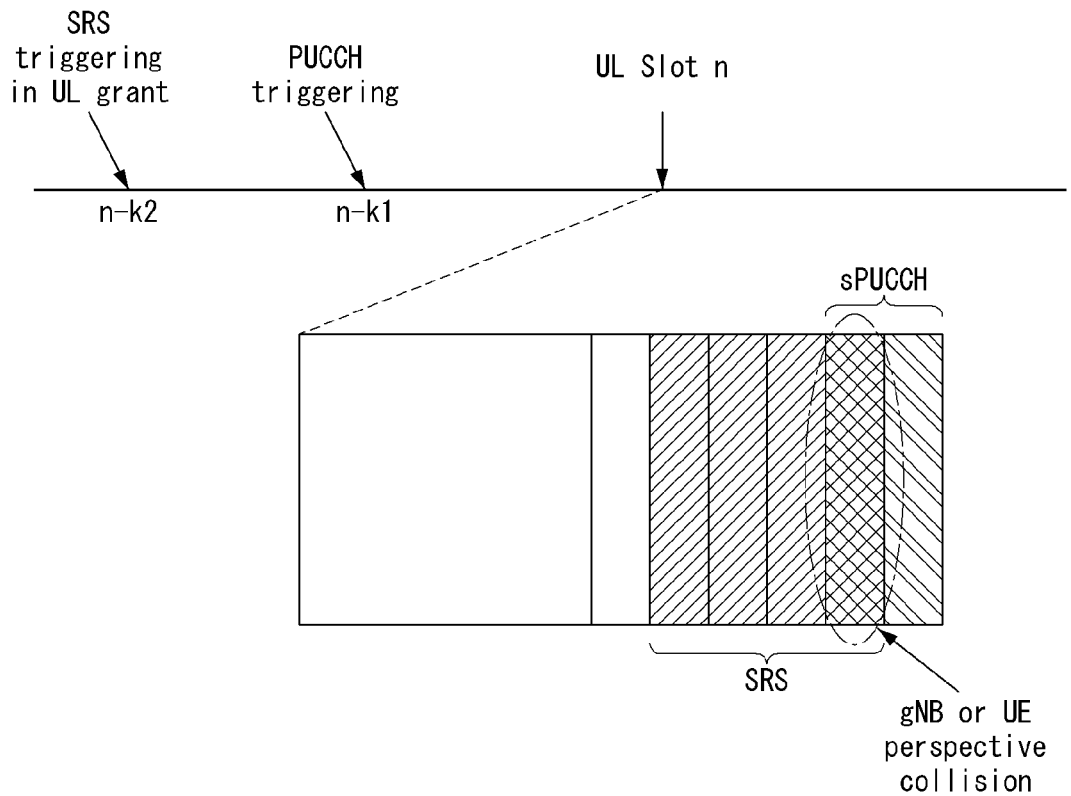
[FIG. 13]
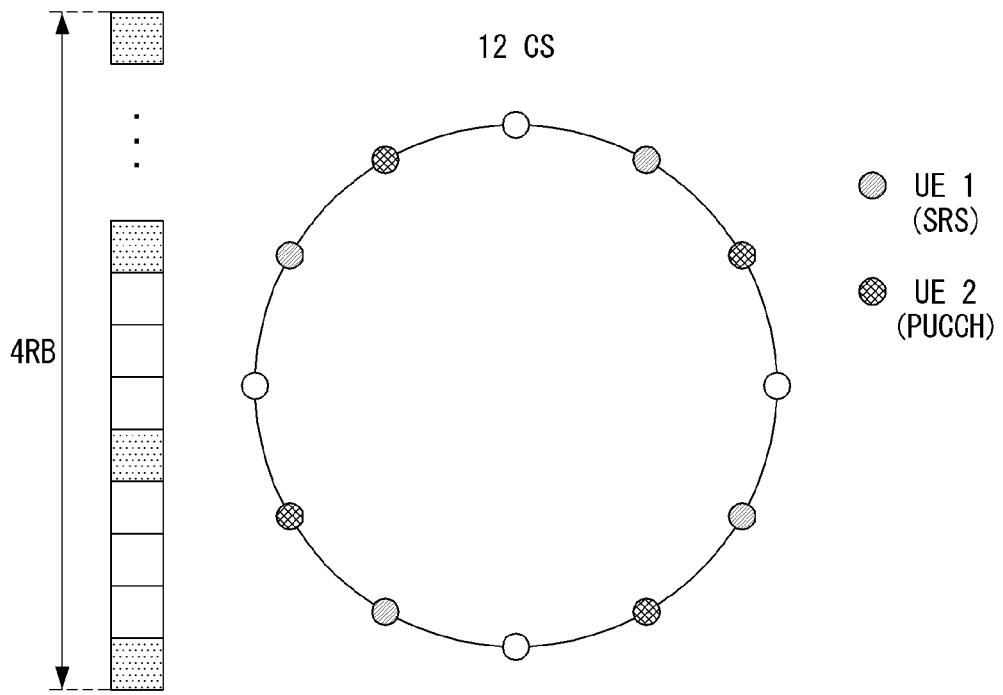

[FIG. 14]
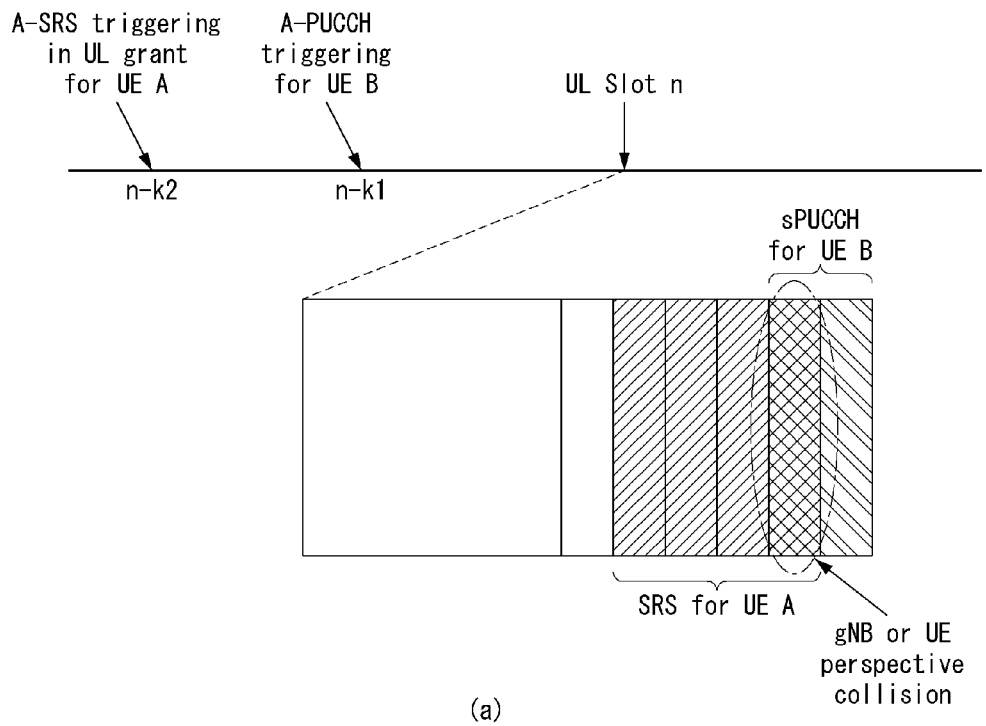
(a)
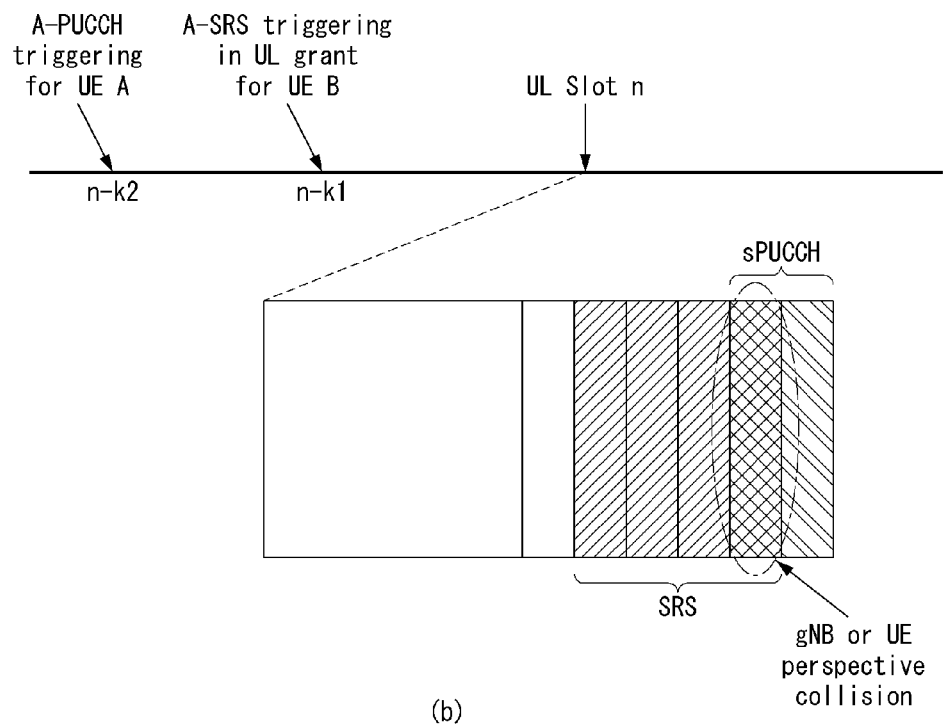
(b)

[FIG. 15]
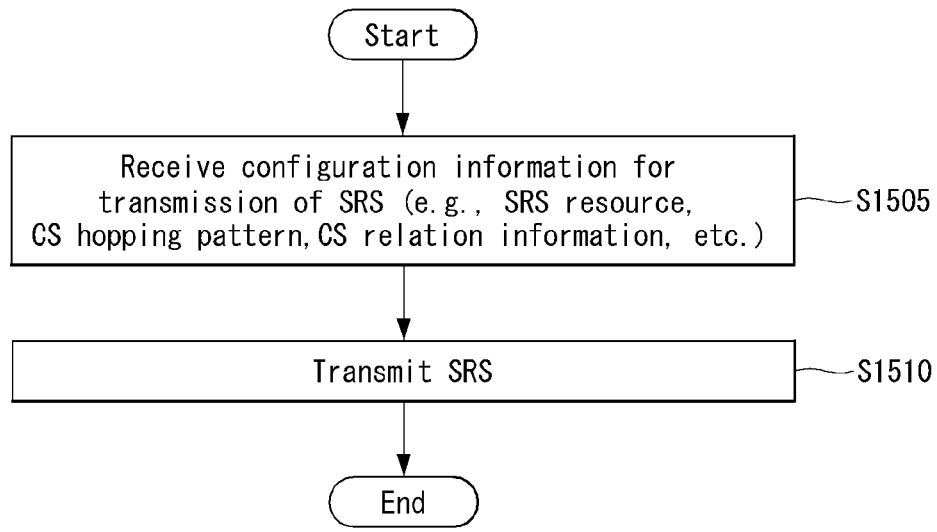
[FIG. 16]
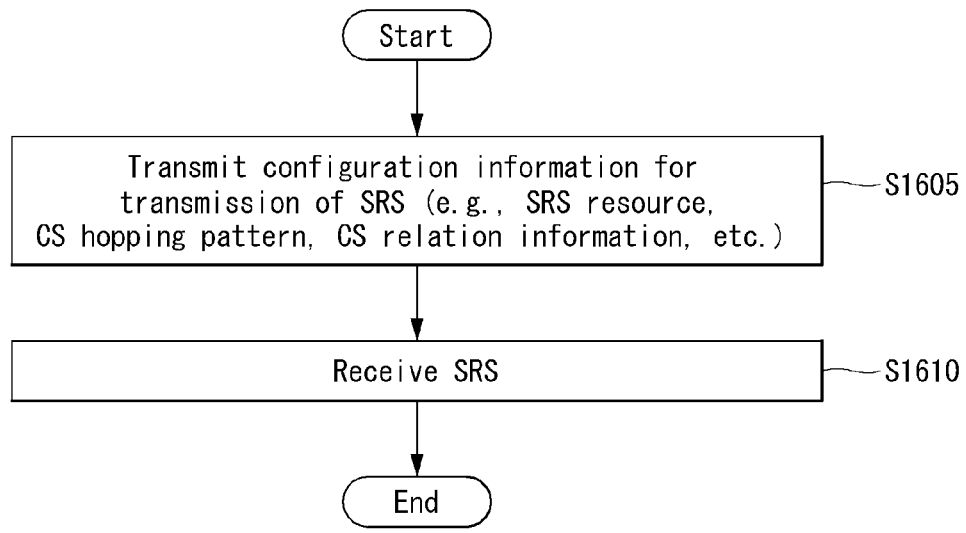

[FIG. 17]
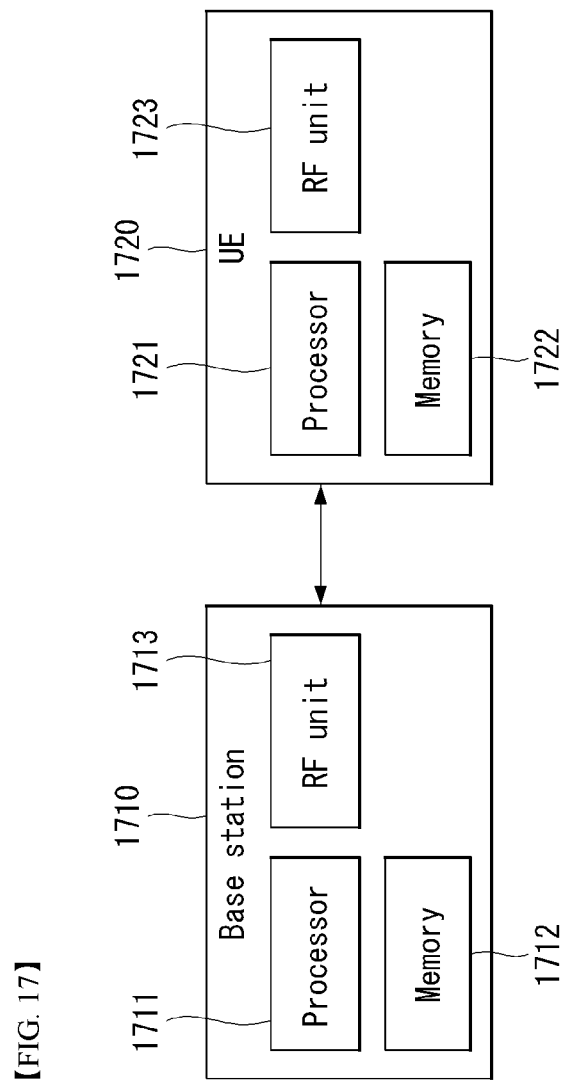

[FIG. 18]
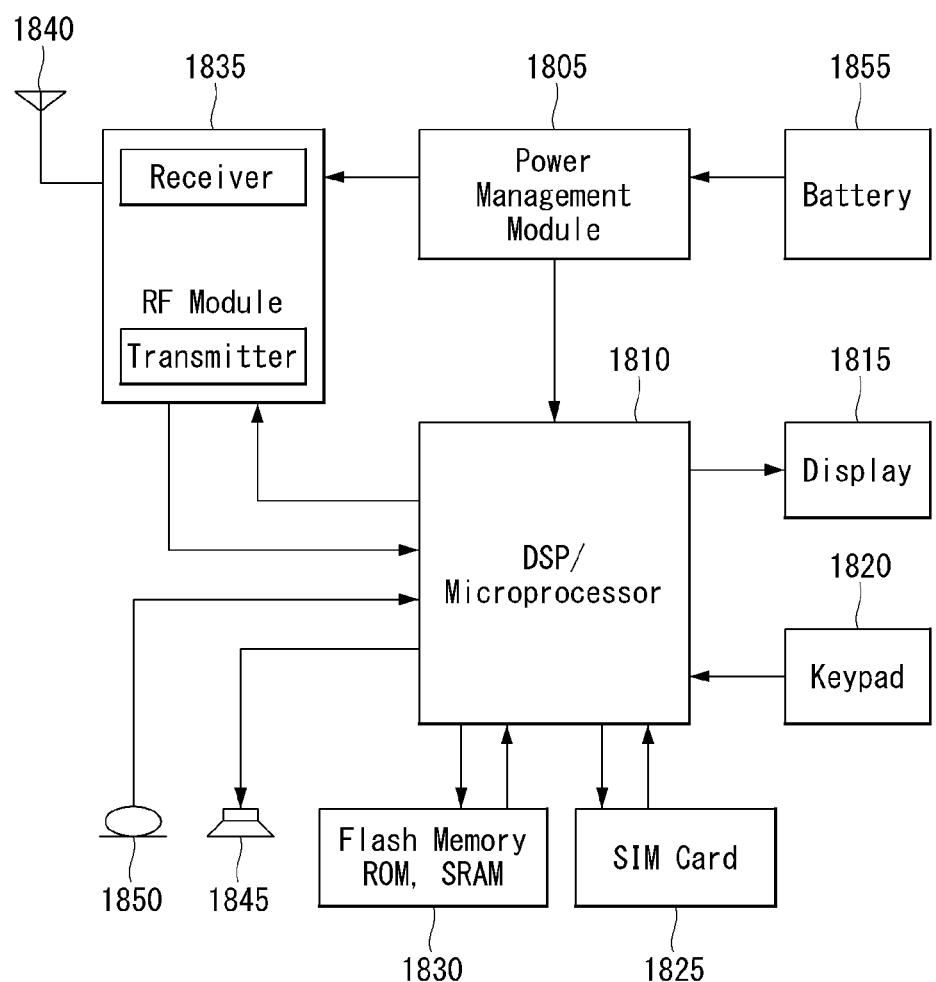

[FIG. 19]
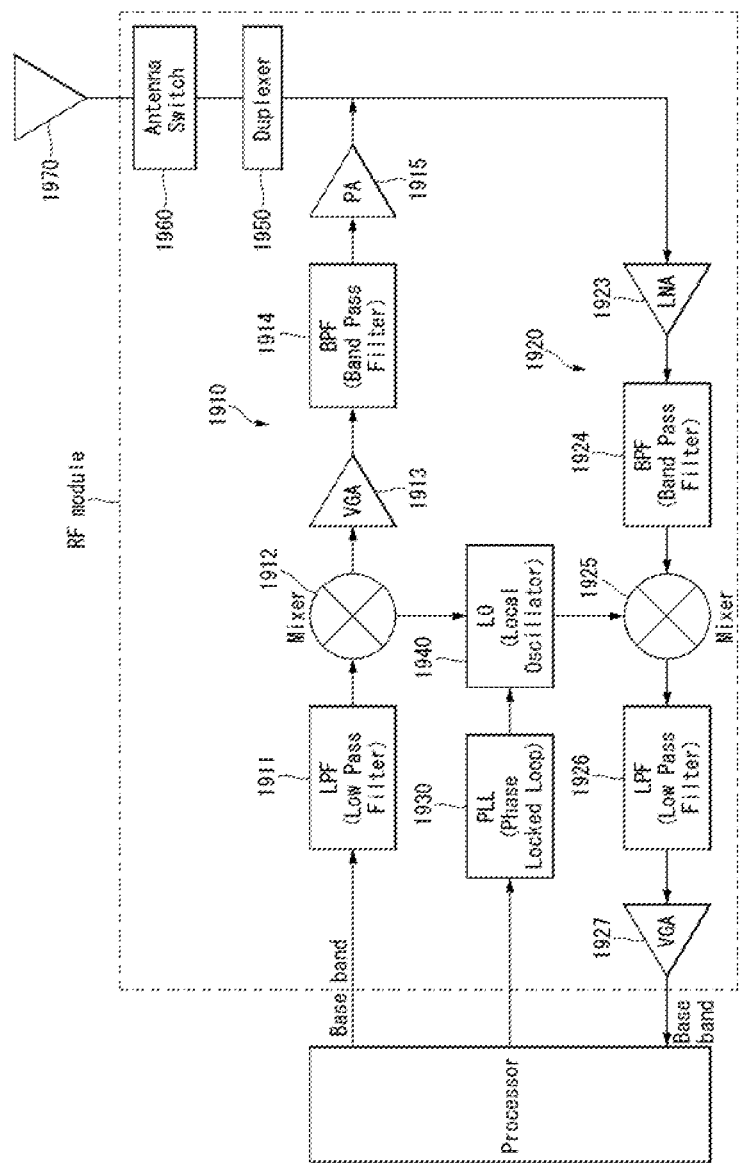

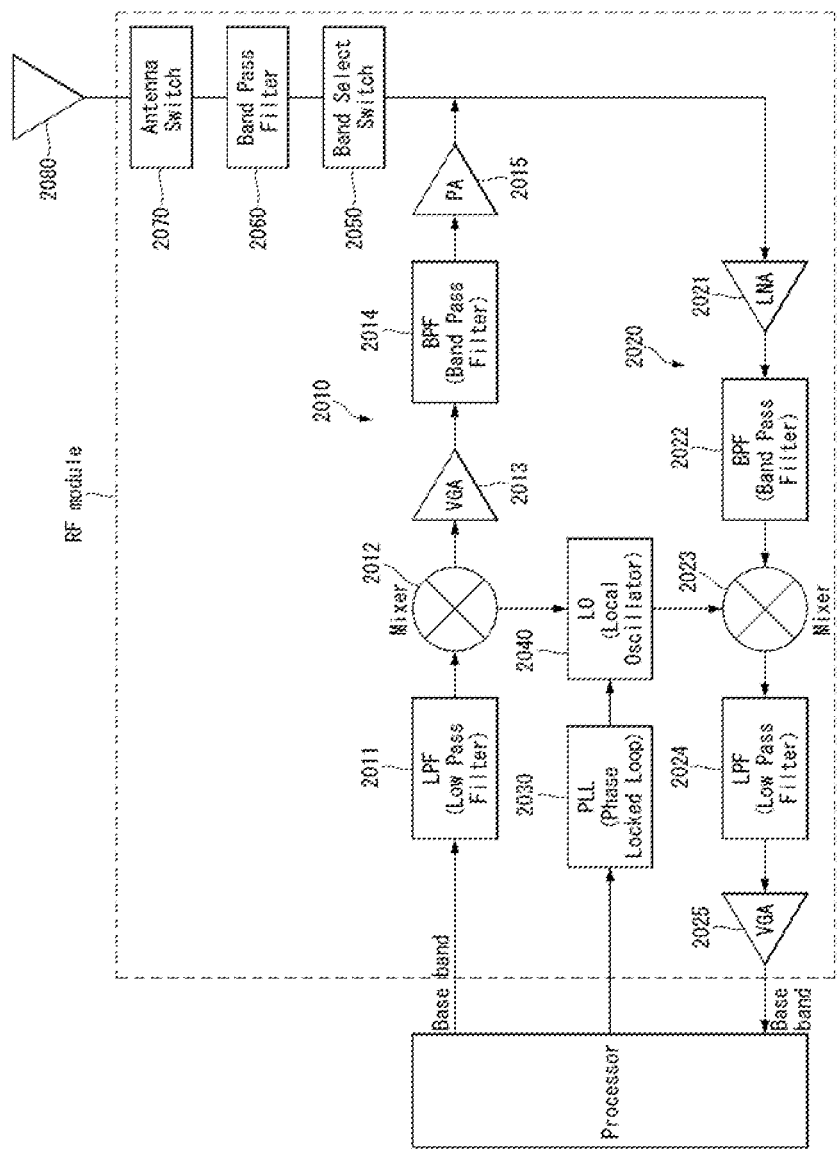
[FIG. 20]

[FIG. 21]

- m_cs for 1-bit ACK/NACK

| HARQ-ACK Value | 0 | 1 |
|---|---|---|
| Sequence cyclic shift | $m_{cs} = 0$ | $m_{cs} = 6$ |

- m_cs for 2-bit ACK/NACK

| HARQ-ACK Value | {0, 0} | {0, 1} | {1, 1} | {1, 0} |
|---|---|---|---|---|
| Sequence cyclic shift | $m_{cs} = 0$ | $m_{cs} = 3$ | $m_{cs} = 6$ | $m_{cs} = 9$ |

- m_cs for 1-bit ACK/NACK and SR

| HARQ-ACK Value | 0 | 1 |
|---|---|---|
| Sequence cyclic shift | $m_{cs} = 3$ | $m_{cs} = 9$ |

- m_cs for 2-bit ACK/NACK and SR

| HARQ-ACK Value | {0, 0} | {0, 1} | {1, 1} | {1, 0} |
|---|---|---|---|---|
| Sequence cyclic shift | $m_{cs} = 1$ | $m_{cs} = 4$ | $m_{cs} = 7$ | $m_{cs} = 10$ |

METHOD FOR TRANSMITTING OR RECEIVING SOUNDING REFERENCE SIGNAL IN WIRELESS COMMUNICATION SYSTEM AND APPARATUS THEREFOR

CROSS-REFERENCE TO RELATED APPLICATIONS

This is the National Stage filing under 35 U.S.C. 371 of International Application No. PCT/KR2019/001027, filed on Jan. 24, 2019, which claims the benefit of U.S. Provisional Application No. 62/621,580, filed on Jan. 24, 2018, the contents of which are all hereby incorporated by reference herein their entirety.

TECHNICAL FIELD

The present disclosure relates to a wireless communication system, and more particularly to a method for transmitting and receiving a sounding reference signal and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure provides a method for transmitting and receiving a sounding reference signal (SRS) in a wireless communication system.

More specifically, the present disclosure provides a method for configuring a cyclic shift (CS) value and/or a hopping pattern to be applied to SRS and/or other uplink transmission with regard to SRS transmission/reception.

The technical problems to be solved by the present disclosure are not limited by the above-mentioned technical problems, and other technical problems which are not mentioned above can be clearly understood from the following description by those skilled in the art to which the present disclosure pertains.

Technical Solution

In one aspect, there is provided a method for a user equipment (UE) to transmit a sounding reference signal (SRS) in a wireless communication system, the method comprising receiving, from a base station, configuration information for a transmission of the SRS, wherein the configuration information includes one or more SRS resources for the transmission of the SRS, a cyclic shift (CS) hopping pattern for the SRS, and CS relation information for whether or not there is a relation in a CS hopping pattern between the SRS and a PUCCH; and transmitting the SRS to the base station through at least one SRS resource of the one or more SRS resources, wherein a CS value applied to the SRS is configured based on a CS hopping pattern for the SRS and the CS relation information.

A transmission resource of the PUCCH may be configured to overlap the at least one SRS resource in which the SRS is transmitted, and a CS value applied to the PUCCH may be configured differently from the CS value applied to the SRS.

If the CS hopping pattern for the SRS and a CS hopping pattern for the PUCCH are configured to be associated with each other based on the CS relation information, the CS hopping pattern for the PUCCH may be configured as shifting the CS hopping pattern for the SRS by a certain offset.

The certain offset may be determined based on a number of antenna ports for the transmission of the SRS and a number of bits of uplink control information transmitted via the PUCCH.

The certain offset may be transmitted via UE-specific higher layer signaling.

If the CS hopping pattern for the SRS and a CS hopping pattern for the PUCCH are configured to be associated with each other based on the CS relation information, the CS hopping pattern for the SRS may be configured as shifting the CS hopping pattern for the PUCCH by a certain offset.

A number of CSs for the SRS may be the same as a number of CSs for the PUCCH, and a resource length on a frequency axis for the transmission of the SRS may be the same as a resource length on a frequency axis for a transmission of the PUCCH.

If a number of CSs for the SRS is different from a number of CSs for the PUCCH, and a sequence length for the SRS is different from a sequence length for the PUCCH, the number of CSs for the PUCCH may be converted into the number of CSs for the SRS, and the sequence length for the PUCCH may be converted into the sequence length for the SRS.

The method may further comprise, if the SRS is an aperiodic SRS, receiving, from the base station, downlink control information (DCI) triggering the transmission of the SRS.

If the PUCCH is an aperiodic PUCCH, and a magnitude of a transmission timing offset for the PUCCH is greater than a magnitude of a transmission timing offset for the SRS, the DCI may include information for a transmission resource of the PUCCH and/or a mapping relationship between the transmission resource of the PUCCH and a transmission resource of the SRS.

If the SRS is a periodic SRS or a semi-persistent SRS, and the PUCCH is an aperiodic PUCCH, DCI triggering the PUCCH may include information for a mapping relationship between a transmission resource of the PUCCH and a transmission resource of the SRS.

In another aspect, there is provided a user equipment (UE) transmitting a sounding reference signal (SRS) in a wireless communication system, the UE comprising a radio frequency (RF) unit configured to transmit and receive a radio signal; and a processor functionally connected to the RF unit, wherein the processor is configured to receive, from a base station, configuration information for a transmission of the SRS, wherein the configuration information includes one or more SRS resources for the transmission of the SRS, a cyclic shift (CS) hopping pattern for the SRS, and CS relation information for whether or not there is a relation in a CS hopping pattern between the SRS and a PUCCH; and transmit the SRS to the base station through at least one SRS resource of the one or more SRS resources, wherein a CS value applied to the SRS is configured based on a CS hopping pattern for the SRS and the CS relation information.

A transmission resource of the PUCCH may be configured to overlap the at least one SRS resource in which the SRS is transmitted, and a CS value applied to the PUCCH may be configured differently from the CS value applied to the SRS.

In another aspect, there is provided a base station receiving a sounding reference signal (SRS) in a wireless communication system, the base station comprising a radio frequency (RF) unit configured to transmit and receive a radio signal; and a processor functionally connected to the RF unit, wherein the processor is configured to transmit, to a user equipment (UE), configuration information for a transmission of the SRS, wherein the configuration information includes one or more SRS resources for the transmission of the SRS, a cyclic shift (CS) hopping pattern for the SRS, and CS relation information for whether or not there is a relation in a CS hopping pattern between the SRS and a PUCCH; receive the SRS from the UE through at least one SRS resource of the one or more SRS resources, wherein a CS value applied to the SRS is configured based on a CS hopping pattern for the SRS and the CS relation information.

A transmission resource of the PUCCH may be configured to overlap the at least one SRS resource in which the SRS is transmitted, and a CS value applied to the PUCCH may be configured differently from the CS value applied to the SRS.

Advantageous Effects

Embodiments of the present disclosure can transmit and receive both a SRS transmission and a PUCCH transmission without dropping one of them even if the SRS transmission and the PUCCH transmission (i.e., UCI transmission) collide with each other in the same resource (e.g., symbol).

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 illustrates an example of an overall structure of a new radio (NR) system according to some implementations of the present disclosure.

FIG. 2 illustrates an example of a relationship between an uplink (UL) frame and a downlink (DL) frame in a wireless communication system according to some implementations of the present disclosure.

FIG. 3 illustrates an example of a frame structure in an NR system.

FIG. 4 illustrates an example of a resource grid supported in a wireless communication system according to implementations of the present disclosure.

FIG. 5 illustrates examples of resource grids for each antenna port and numerology according to implementations of the present disclosure.

FIG. 6 illustrates an example of a self-contained structure according to implementations of the present disclosure.

FIG. 7 illustrates a transceiver unit model in a wireless communication system to which a method proposed in the present disclosure is applicable.

FIG. 8 illustrates a hybrid beamforming structure from the point of view of TXRU and physical antenna in a wireless communication system to which a method proposed in the present disclosure is applicable.

FIG. 9 illustrates an example of a beam sweeping operation for a synchronization signal and system information.

FIG. 10 illustrates an example of a method for configuring a SRS hopping pattern.

FIG. 11 illustrates examples of cyclic shift configuration for a SRS transmission UE.

FIG. 12 illustrates an example of a method for transmitting SRS and PUCCH in a wireless communication system to which a method described in the present disclosure is applicable.

FIG. 13 illustrates an example of a CS configuration method for SRS and PUCCH to which a method described in the present disclosure is applicable.

FIG. 14 illustrates other examples of a method for transmitting SRS and PUCCH in a wireless communication system to which a method described in the present disclosure is applicable.

FIG. 15 illustrates an example of an operation flow chart of a UE transmitting a SRS in a wireless communication system to which a method described in the present disclosure is applicable.

FIG. 16 illustrates an example of an operation flow chart of a base station receiving a SRS in a wireless communication system to which a method described in the present disclosure is applicable.

FIG. 17 illustrates a block configuration diagram of a wireless communication device to which methods described in the present disclosure are applicable.

FIG. 18 illustrates a block configuration diagram of a communication device according to an embodiment of the present disclosure.

FIG. 19 illustrates an example of a RF module of a wireless communication device to which a method described in the present disclosure is applicable.

FIG. 20 illustrates another example of a RF module of a wireless communication device to which a method described in the present disclosure is applicable.

FIG. 21 illustrates an example of values of m_cs depending on uplink control information.

MODE FOR INVENTION

Some implementations of the present disclosure are described in detail with reference to the accompanying drawings. A detailed description to be disclosed along with the accompanying drawings is intended to describe some exemplary implementations of the present disclosure and is not intended to describe a sole implementation of the present disclosure. The following detailed description includes more details in order to provide full understanding of the present disclosure. However, those skilled in the art will understand that the present disclosure may be implemented without such more details.

In some cases, in order to prevent a concept of the present disclosure from being ambiguous, known structures and devices may be omitted or illustrated in a block diagram format based on core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Implementations of the present disclosure may be supported by the standard documents disclosed in at least one of IEEE 802, 3GPP, or 3GPP2, that is, radio access systems. That is, one or more features or portions of the implementations of the present disclosure may be implemented in accordance with such standard documents, even if those specific features or portions are not expressly disclosed herein. Furthermore, terms that are used in this document may be described by the standard documents.

In the implementations described herein, 3GPP LTE/LTE-A/New RAT (NR) is chiefly described, but the technical characteristics of the present disclosure are not limited thereto.

As propagation of smart phones and Internet of things (IoT) terminals rapidly spreads, the amount of information which is transmitted and received through a communication network increases. Accordingly, in the next generation wireless access technology, an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a user equipment sensitive to reliability and/or latency of communication is also discussed.

Hereinafter, in this specification, for easy description, the next-generation wireless access technology is referred to as a new radio access technology (RAT) (NR) radio access technology and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 illustrates an example of an overall structure of a new radio (NR) system according to some implementations of the present disclosure.

Referring to FIG. 1, an NG-RAN is composed of gNBs that provide an NG-RA user plane (new AS sublayer/PDCP/

RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

The numerology may be configured such that time/frequency granularity is dynamically allocated according to respective services (e.g., eMBB, URLLC, mMTC, etc.) and scenarios (e.g., high speed, etc.).

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f / 100) \cdot T_s=10$ ms. The radio frame is composed of ten subframes each having a section of $T_{sf}=(\Delta f_{max} = N_f/1000) \cdot T_s=1$ ms. In this case, there may be a set of UL frames and a set of DL frames.

FIG. 2 illustrates an example of a relationship between an uplink (UL) frame and a downlink (DL) frame in a wireless communication system according to some implementations of the present disclosure.

As illustrated in FIG. 2, a UL frame number I from a User Equipment (UE) needs to be transmitted $T_{TA}=N_{TA}T_s$ before the start of a corresponding DL frame in the UE.

Regarding the numerology µ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number ($N_{symb}^{slot}$) of OFDM symbols per slot, the number ($N_{slot}^{frame,\mu}$) of slots per radio frame, and the number ($N_{slot}^{subframe,\mu}$) of slots per subframe in normal CP, and Table 3 shows the number of OFDM symbols per slot, the number of slots per radio frame, and the number of slots per subframe in extended CP.

TABLE 2

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| µ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in an NR system. FIG. 3 is intended merely for illustration purposes but not for limiting the scope of the disclosure.

Table 3 represents an example where µ=2, i.e., the subcarrier spacing (SCS) is 60 kHz. Referring to Table 2, one subframe (or frame) may include four slots. The "1 subframe={1,2,4} slots" in FIG. 3 is an example, and the number of slots that may be included in one subframe may be defined as shown in Table 2.

The mini-slot may consist of 2, 4, or 7 symbols or more or less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relation. Herein, the large-scale properties may include at least one of delay spread, Doppler spread, Frequency shift, average received power, and Received Timing.

FIG. 4 illustrates an example of a resource grid supported in a wireless communication system according to implementations of the present disclosure.

Referring to FIG. 4, a resource grid is composed of $N_{RB}^\mu N_{sc}^{RB}$ subcarriers in a frequency domain, each subframe composed of 14·2µ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 5, one resource grid may be configured for the numerology µ and an antenna port p.

FIG. 5 illustrates examples of resource grids for each antenna port and numerology according to implementations of the present disclosure.

Each element of the resource grid for the numerology μ and the antenna port p is indicated as a resource element, and may be uniquely identified by an index pair (k,$\bar{l}$) Herein, k=0, ..., $N_{RB}^{\mu}N_{sc}^{RB}$−1 is an index in the frequency domain, and $\bar{l}$=0, ..., $2^{\mu}N_{symb}^{(\mu)}$−1 indicates a location of a symbol in a subframe. To indicate a resource element in a slot, the index pair (k,l) is used. Herein, l=0, ..., $N_{symb}^{\mu}$−1.

The resource element (k,$\bar{l}$) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

The physical resource block is defined with $N_{sc}^{RB}$=12 consecutive subcarriers in the frequency domain.

Point A plays a role as a common reference point of the resource block grid and may be obtained as follows.

offsetToPointA for PCell downlink refers to the frequency offset between point A and the lowest subcarrier of the lowest resource block overlapping the SS/PBCH block used by the UE for initial cell selection and is represented with resource block units assuming a subcarrier interval of 15 kHz for FR1 and a subcarrier interval of 60 kHz for FR2;

absoluteFrequencyPointA refers to the frequency-position of point A expressed as in the absolute radio-frequency channel number (ARFCN).

The common resource blocks are numbered up from zero in the frequency domain for subcarrier spacing configuration μ.

The center of subcarrier 0 of common resource block 0 for subcarrier spacing configuration μ matches 'point A.'. In the frequency domain, resource elements (k,l) for common resource block number $n_{CRB}^{\mu}$ and subcarrier spacing configuration μ may be given as Equation 1 below.

$$n_{CRB}^{\mu} = \left\lfloor \frac{k}{N_{sc}^{RB}} \right\rfloor$$ [Equation 1]

Here, k may be defined relative to point A so that k=0 corresponds to the subcarrier with point A centered. The physical resource blocks are numbered from 0 to $N_{BWP,i}^{size}$−1 in the bandwidth part (BWP), and i is the number of the BWP. In BWP i, the relationship between physical resource block $n_{PRB}$ and common resource block $n_{CRB}$ may be given as Equation 2 below.

$$n_{CRB} = n_{PRB} + N_{BWP,i}^{start}$$ [Equation 2]

Here, $N_{BWP,i}^{start}$ may be common resource blocks in which the BWP starts relative to common resource block 0.

Self-Contained Structure

A time division duplexing (TDD) structure considered in an NR system is a structure in which both uplink (UL) and downlink (DL) are processed in one subframe. This is for minimizing the latency of data transmission in the TDD system, and this structure is referred to as a self-contained subframe structure.

FIG. 6 illustrates one example of a self-contained structure according to implementations of the present disclosure. FIG. 6 is shown as an example, and does not limit the scope of the present disclosure.

Referring to FIG. 6, it is assumed that one transmission unit (e.g., slot or subframe) consists of 14 orthogonal frequency division multiplexing (OFDM) symbols as in legacy LTE.

In FIG. 6, a region 602 refers to a downlink control region and a region 604 refers to an uplink control region. Further, a region (that is, a region without a separate indication) other than the regions 602 and 604 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 6 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained slot structure illustrated in FIG. 6, a time gap for a process of switching from a transmission mode to a reception mode in a base station (eNodeB, eNB, or gNB) and/or a terminal (user equipment (UE)) or a process of switching from the reception mode to the transmission mode is required. In relation to the time gap, when the uplink transmission is performed after the downlink transmission in the self-contained slot, some OFDM symbol(s) may be configured as a guard period (GP).

PUCCH Format in NR System

In the NR system, multiple PUCCH formats may be defined by a duration and/or a payload size. For example, the following Table 4 represents PUCCH formats considered in the NR system.

TABLE 4

| Format | PUCCH length in OFDM symbols | Number of bits | [Usage] | Etc. |
|---|---|---|---|---|
| 0 | 1-2 | ≤2 | HARQ, SR | Sequence selection |
| 1 | 4-14 | ≤2 | HARQ, [SR] | Sequence modulation (BPSK, QPSK) |
| 2 | 1-2 | >2 | HARQ, CSI, [SR] | [CP-OFDM] |
| 3 | 4-14 | [>N] | HARQ, CSI, [SR] | DFT-s-OFDM (no UE multiplexing) |
| 4 | 4-14 | >2, [≤N] | HARQ, CSI, [SR] | DFT-s-OFDM (Pre DFT OCC) |

Referring to FIG. 4, format 0 and format 2 may be classified as short PUCCH, and format 1, format 3 and format 4 may be classified as long PUCCH. In the NR system, a transmit diversity scheme for PUCCH and simultaneous transmission of PUSCH and PUCCH may not be supported.

NR Antenna Switching

The NR system can support inter-slot antenna switching and intra-slot antenna switching. In the intra-slot antenna switching, a guard period may be configured.

In 1T2R (1 transmission 2 reception)/2T4R (2 transmission 4 reception), the UE may be configured with two SRS resources consisting of one symbol or two symbols. On the other hand, in 1T4R (1 transmission 4 reception), the UE may be configured with four SRS resources, each of which consists of a single symbol and a single port.

Each port of the configured resource may be associated with a different UE antenna.

Analog Beamforming

Since a wavelength is short in a millimeter wave (mmW), multiple antenna elements can be installed in the same size of area. That is, a wavelength in the frequency band of 30 GHz is 1 cm, and thus a total of 64 (8×8) antenna elements can be installed in two-dimensional arrangement at intervals of 0.5 lambda (i.e., wavelength) on 4×4 (4 by 4) cm panel. Therefore, in the mmW, the coverage can be enhanced or a throughput can be increased by increasing a beamforming (BF) gain using the multiple antenna elements.

In this case, when a transceiver unit (TXRU) is installed so as to adjust transmission power or a phase for each antenna element, independent beamforming is possible for each frequency resource. However, a method for installing the TXRU in all antenna elements (e.g., 100 antenna elements) may be ineffective in terms of cost. As a result, a method for mapping multiple antenna elements to one TXRU and controlling a direction of a beam by using an analog phase shifter may be considered. The aforementioned analog beamforming method may generate only one beam direction in all bands, so that a frequency selective beam operation may not be performed.

As a result, hybrid beamforming with B TXRUs that are fewer than Q antenna elements, in the form of an intermediate form of digital beamforming and analog beamforming, may be considered. In this case, although there is a difference depending on a connection method of B TXRUs and Q antenna elements, the number of directions of the beams that may be transmitted at the same time is limited to B or less.

Hereinafter, representative examples of TXRUs and antenna elements are described with reference to drawings.

FIG. 7 illustrates a transceiver unit model in a wireless communication system to which a method proposed in the present disclosure may be applied.

A TXRU virtualization model indicates a relationship between the output signal of a TXRU and output signals of antenna elements. The TXRU virtualization model may be divided into a TXRU virtualization model option-1: a sub-array partition model, as in FIG. 7(*a*), and a TXRU virtualization model option-2: a full-connection model, as in FIG. 7(*b*), depending on a correlation relationship between the antenna elements and the TXRU.

Referring to FIG. 7(*a*), in the case of the sub-array partition model, the antenna elements are partitioned into multiple antenna element groups, and each TXRU is connected to one of the groups. In this case, the antenna elements are connected to only one TXRU.

Referring to FIG. 7(*b*), in the case of the full-connection model, the signals of multiple TXRUs are combined and transmitted to a single antenna element (or an array of antenna elements). That is, FIG. 7(*b*) illustrates a method in which TXRUs are connected to all antenna elements. In this case, the antenna elements are connected to all the TXRUs.

In FIG. 7, q is a transmission signal vector of antenna elements having M co-polarizations within one column. W is a wideband TXRU virtualization weight vector. W indicates a phase vector multiplied by an analog phase shifter. That is, the direction of analog beamforming is determined by W. x is the signal vector of M_TXRU TXRUs.

In this case, mapping between an antenna port and the TXRUs may be 1-to-1 or 1-to-many.

In FIG. 7, the mapping (TXRU-to-element mapping) between the TXRU and the antenna element merely illustrates one example, and the present disclosure is not limited thereto. The present disclosure may be identically applied to mapping between a TXRU and an antenna element which may be implemented in various forms, from the point of view of hardware.

Hybrid Beamforming

In the new RAT system, if multiple antennas are used, a hybrid beamforming scheme in which digital beamforming and analog beamforming have been combined is considered.

In this case, analog beamforming (or radio frequency (RF) beamforming) means an operation of performing precoding (or combining) in an RF stage. In the hybrid beamforming, each of a baseband stage and an RF stage performs precoding (or combining). Accordingly, there are advantages in that the number of RF chains and the number of digital (D)/analog (A) (or A/D) converters can be reduced and performance close to digital beamforming can also be obtained.

The hybrid beamforming structure may be represented as N transceiver units (TXRUs) and M physical antennas. Digital beamforming for L data layers which may be transmitted in a transmission stage may be represented as an N by L matrix. N digital signals that are subsequently transformed are transformed into an analog signal through the TXRUs. Thereafter, analog beamforming represented as an M by N matrix is applied to the analog signal.

FIG. 8 illustrates an example of a hybrid beamforming structure from the point of view of TXRU and physical antenna.

Referring to FIG. 8, it is assumed that the number of digital beams is L, and the number of analog beams is N.

The NR system considers a method of supporting more efficient beamforming for UEs located in a specific region by being designed so that a base station can change analog beamforming on a per symbol basis. In addition, as illustrated in FIG. 8, when N specific TXRUs and M RF antennas are defined as one antenna panel, the NR system considers a method of adopting a plurality of antenna panels to which independent hybrid beamformings are applicable.

As described above, when the base station uses a plurality of analog beams, analog beams that are advantageous for signal reception may be different for each UE. Therefore, a beam sweeping operation is considered, which changes a plurality of analog beams to be applied by the base station on a per symbol basis in a specific subframe (SF) at least with respect to the synchronization signal, system information, paging, etc. so that all the UEs can have a reception opportunity.

FIG. 9 illustrates an example of a beam sweeping operation for a synchronization signal and system information.

Referring to FIG. 9, a physical resource (or physical channel) in which system information is transmitted in a broadcasting manner in the New RAT is called a physical broadcast channel (xPBCH).

In this case, analog beams belonging to different antenna panels within one symbol may be transmitted at the same time. In order to measure a channel according to an analog beam, a method of introducing a beam reference signal (BRS), that is, a reference signal to which a single analog beam (corresponding to a specific antenna panel) is applied and which is transmitted, as illustrated in FIG. 9, is being discussed.

In this case, the BRS may be defined with respect to a plurality of antenna ports. Each antenna port of the BRS may correspond to one analog beam. In this case, unlike the BRS, all analog beams within an analog beam group may be applied to a synchronization signal or xPBCH so that signals transmitted by given UEs are well received, and the synchronization signal or xPBCH may be transmitted.

SRS Transmission in NR System

In the NR system, a SRS sequence for an SRS resource may be generated according to the following Equation 3.

$$r^{(p_i)}(n,l') = r_{u,v}^{(\alpha_i, \delta)}(n)$$  [Equation 3]

$$0 \leq n \leq 271 \cdot N_{sc}^{RB}/K_{TC}$$

$$l' \in \{0, 1, \ldots, N_{symb}^{SCS}-1\}$$

In the Equation 3, $r_{u,v}^{(\alpha_i, \delta)}(n)$ denotes a sequence configured by a sequence number v and a sequence group u of the SRS, and a transmission comb (TC) number $K\_TC(K_{TC})$ may be contained in the higher layer parameter SRS-TransmissionComb.

A cyclic shift (CS) $\alpha_i$ for an antenna port $p_i$ may be given by the following Equation 4.

$$\alpha_i = 2\pi \frac{n_{SRS}^{cs,i}}{n_{SRS}^{cs,max}}$$  [Equation 4]

$$n_{SRS}^{cs,i} = \left(n_{SRS}^{cs} + \frac{n_{SRS}^{cs,max} p_i}{N_{ap}}\right) \bmod n_{SRS}^{cs,max}$$

In the Equation 4, $n_{SRS}^{cs} \in \{0, 1, \ldots, n_{SRS}^{cs,max}\}$ may be given by the higher layer parameter SRS-CyclicShiftConfig. A maximum number of cyclic shift may be 12 (i.e., $n_{SRS}^{cs,max}=12$) if $K\_TC$ is 4 and 8 (i.e., $n_{SRS}^{cs,max}=8$) if $K\_TC$ is 2.

The sequence group u ($u=(f_{gh})(n_{s,f}^\mu,l')+n_{ID}^{SRS}$ mod 30)mod 30) and the sequence number v may depend on the higher layer parameter SRS-GroupSequenceHopping. The SRS sequence identity $n_{ID}^{SRS}$ may be given by the higher layer parameter SRS-SequenceId. l'(i.e., $l' \in \{0, 1, \ldots, N_{symb}^{SRS}-1\}$) denotes an OFDM symbol number within the corresponding SRS resource.

If the value of SRS-GroupSequenceHopping equals zero, the group hopping and the sequence hopping are not used, and this may be represented by the following Equation 5.

$$f_{gh}(n_{s,f}^{\mu},l')=0$$

$$v=0$$  [Equation 5]

In the Equation 5, f_gh(x, y) denotes the sequence group hopping, and v denotes the sequence hopping.

Alternatively, if the value of SRS-GroupSequenceHopping equals one, not the sequence hopping but the group hopping may be used, and this may be represented by the following Equation 6.

$$f_{gh}(n_{s,f},l')=(\Sigma_{m=0}^{7}c(8(n_{s,f}^{\mu}N_{symb}^{SRS}+l')+m)\cdot 2^m)\bmod 30$$

$$v=0$$  [Equation 6]

In the Equation 6, f_gh(x, y) denotes the sequence group hopping, and v denotes the sequence hopping. In addition, c(i) denotes a pseudo-random sequence and may be initialized with $c_{init}=\lfloor n_{ID}^{SRS}/30 \rfloor$ at the beginning of each radio frame.

Alternatively, if the value of SRS-GroupSequenceHopping equals two, not the group hopping but the sequence hopping may be used, and this may be represented by the following Equation 7.

$$f_{gh}(n_{s,f},l')=0$$  [Equation 7]

$$v = \begin{cases} c(n_{s,f}N_{symb}^{SRS}+l') & M_{sc,b}^{SRS} \geq 3N_{sc}^{RB} \\ 0 & \text{otherwise} \end{cases}$$

In the Equation 7, f_gh(x, y) denotes the sequence group hopping, and v denotes the sequence hopping. In addition, c(i) denotes a pseudo-random sequence and may be initialized with $c_{init}=\lfloor n_{ID}^{SRS}/30 \rfloor \cdot 2^5 + (n_{ID}^{SRS}+\Delta_{ss}) \bmod 30$ at the beginning of each radio frame, where $\Delta_{ss} \in \{0, 1, \ldots, 29\}$.

Sounding Reference Signal (SRS) Hopping

SRS hopping operation may be performed only upon periodic SRS triggering (e.g., triggering type 0). The allocation of SRS resources may be provided according to a predefined hopping pattern. In this case, a hopping pattern may be UE-specifically designated to higher layer signalling (e.g., RRC signalling), and the overlapping cannot be allowed.

The SRS is frequency-hopped using the hopping pattern in each subframe in which the cell-specific and/or UE-specific SRS is transmitted, and a start location on a frequency domain of the SRS hopping and a hopping formula may be interpreted through the following Equation 8.

[Equation 8]

$$k_0^{(p)} = \bar{k}_0^{(p)} + \sum_{b=0}^{B_{SRS}} K_{TC} M_{sc,b}^{RS} n_b$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_B & \text{otherwise} \end{cases}$$

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \\ \qquad \left\lfloor \frac{n_{SRS} \bmod \prod_{b'=b_{hop}}^{b} N_{b'}}{\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

$$n_{SRS} = \begin{cases} 2N_{SP}n_f + 2(N_{SP}-1)\left\lfloor \frac{n_s}{10} \right\rfloor + \\ \qquad \left\lfloor \frac{T_{offset}}{T_{offset\_max}} \right\rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases}$$

In the Equation 8, $n_{SRS}$ denotes a hopping ongoing interval on a time domain, $N_b$ denotes the number of branches allocated to tree level b, and b is determined by $B_{SRS}$ configuration in the dedicated RRC.

FIG. 10 illustrates an example of a method for configuring a SRS hopping pattern. More specifically, FIG. 10 illustrates an example of a hopping pattern from slot $n_s=1$ to slot $n_s=4$.

In FIG. 10, it is assumed that CSRS=1, N^UL_RB=100, $n_f=1$, and $n_s=1$ via the cell-specific signalling (e.g., cell-specific RRC signalling). Further, for UEs A, B and C, $B_{SRS}$, $b_{hop}$, $n_{RRC}$, and $T_{SRS}$ may be configured via the cell-specific signalling (e.g., cell-specific RRC signalling). More specifically, the UE A may be configured such that $B_{SRS}$=1, $b_{hop}$=1, $n_{RRC}$=22, and $T_{SRS}$=10, the UE B may be configured such that $B_{SRS}$=2, $b_{hop}$=0, $n_{RRC}$=10, and $T_{SRS}$=5, and the UE C may be configured such that $B_{SRS}$=3, $b_{hop}$=2, $n_{RRC}$=23, and $T_{SRS}$=2.

Cyclic Shift (CS) Hopping

A cyclic shift (CS) a may vary as a function of a symbol number and a slot number according to the following Equation 9.

$$\alpha_l = \frac{2\pi}{N_{sc}^{RB}}((m_0 + m_{cs} + n_{cs}(n_s, l + l')) \mod N_{sc}^{RB})$$ [Equation 9]

In the Equation 9, n_s denotes a slot number of a radio frame, and l denotes an OFDM symbol number in the PUCCH transmission, where l=0 may correspond to a first OFDM symbol of the PUCCH transmission. In addition, l' denotes an index of an OFDM symbol in a slot corresponding to the first OFDM symbol of the PUCCH transmission, and m_cs may be given by the table of FIG. 21.

FIG. 21 represents values of m_cs depending on uplink control information (e.g., ACK/NACK information, SR etc.).

The function n_cs(n_s,l) may be given by the following Equation 10.

$$n_{cs}(n_s,l) = \Sigma_{m=0}^{7} 2^m c(14 \cdot 8 n_s + 8l + m)$$ [Equation 10]

In the Equation 10, c(i) denotes a pseudo-random sequence and may be initialized with $c_{init}=n_{ID}$ at the beginning of each radio frame.

In the NR system, with regard to a reporting timing of channel state information (CSI), a UE may be configured to perform actual (aperiodic) CSI reporting after a certain offset (e.g., higher layer parameter aperiodicReportSlotOffset) from a time at which CSI reporting is triggered via DCI.

In addition, with regard to PUCCH transmission, a certain ACK/NACK reporting timing may be configured to the UE. For example, if the UE receives a grant (e.g., DL grant, DCI format 1_0/1_1) from a base station via PDCCH and then receives a PDSCH, the UE may be configured to report ACK/NACK for the corresponding PDSCH from the base station after a certain offset (e.g., offset on a per slot basis). In this instance, information for the corresponding offset may be included in a specific field (e.g., PDSCH-to-HARQ timing indicator) within the grant.

With regard to SRS transmission (e.g., aperiodic SRS, etc.) in the NR system, an offset (e.g., offset on a per slot basis) between a SRS request timing and an actual SRS transmission timing (i.e., SRS resource set) is configurable. For example, for configuration of the SRS transmission timing, candidates for one or more SRS triggering time offsets may be configured via higher layers, and a method may be used which indicates a timing offset to be actually applied through a specific field (e.g., SRS trigger offset) of a grant (e.g., UL/DL grant, DCI format 0_1/1_1) related to the SRS transmission.

Accordingly, as described above, considering that a timing for the SRS transmission and other UL transmission in the NR system can be variously configured, there may occur a case where SRS transmission and other UL transmission(s), that the UE will perform, overlap each other.

For example, in the NR system, SRS and PUCCH (particularly, short PUCCH) may be multiplexed in the last six symbols based on one slot. A location of a SRS allocation symbol and the number of symbols may be UE-specifically configured. In this instance, if the (s)PUCCH is transmitted in a slot in which the SRS is configured, and there occurs a collision between SRS and PUCCH symbols, the UE may be basically configured to drop the SRS symbol.

However, in the NR system, the PUCCH and the SRS may need to be simultaneously configured within the corresponding slot (e.g., ultra reliable low latency communication (URLLC)). Thus, the base station indicates configuration related to the simultaneous transmission of SRS and PUCCH, and a method needs to be considered which allocates and/or configures so that SRS and PUCCH, i.e., uplink control information (UCI) can be simultaneously transmitted in the corresponding resource.

With regard to this, the present disclosure proposes a method of configuring a cyclic shift (CS) for SRS and/or PUCCH for the purpose of the simultaneous transmission of SRS and PUCCH (i.e., UCI) in a specific resource.

First, in the NR system, the number of ports in one SRS resource may be configured up to four. In this instance, each port may be mapped to four CS values, and orthogonality between the ports may be maintained.

On the other hand, in case of 1T4R (1Tx & 4Rx) or 1T2R (1Tx & 2Rx), the number of beams that can be simultaneously transmitted is one, and this means that only one port within one SRS resource may be mapped for the SRS transmission. Further, in case of 2T4R (2Tx & 4Rx), up to two ports within the SRS resource may be mapped for the SRS transmission. Thus, there may occur a case where there is remaining CS upon SRS transmission.

FIG. 11 illustrates examples of cyclic shift configuration for a SRS transmission UE. FIG. 11 is merely a figure for convenience of explanation and does not limit the range of the present disclosure.

Referring to FIG. 11, it is assumed that 4RB is allocated as a SRS resource, and 12 CSs can be used for the SRS transmission if a transmission comb (TC) is 4.

(a) of FIG. 11 illustrates an example of a method of allocating 12 CSs to 4-port SRS transmission UEs. More specifically, each of UE 1, UE 2, and UE 3 may support 4-port SRS transmission, and four CSs may be allocated to each UE. In this case, all the 12 CSs may be allocated for the SRS transmission. That is, the corresponding SRS resources may be configured to be used for UL sounding of up to three UEs based on a code-division multiplexing (CDM) scheme using different CSs.

Unlike this, (b) of FIG. 11 illustrates an example of a method of allocating 12 CSs to UE(s), to which antenna switching (e.g., 1T4R, 2T4R etc.) is applied, in addition to the 4-port SRS transmission UEs. More specifically, the UE 2 may support the 4-port SRS transmission, and only 7 CSs of 12 CSs may be allocated if 1T4R antenna switching and 2T4R antenna switching are respectively applied to the UE 1 and the UE 3.

That is, as illustrated in (b) of FIG. 11, if the UEs to which the antenna switching is applied are configured to use the corresponding SRS resources, remaining CS(s) may exist unlike (a) of FIG. 11. In this case, the remaining CS resources may be utilized for other purposes. In other words, in the SRS resource allocation for the three UEs (i.e., three users), an opportunity to allocate the corresponding SRS resources to three or more UEs may occur, or an opportunity to use the corresponding SRS resources for other purposes may occur.

However, considering the simultaneous transmission of SRS and UCI through the CDM, the following may need to be considered.

First, there may be a difference in a resource unit between PUCCH resource and SRS resource. For example, UCI corresponding to PUCCH format 0 may be allocated to 1RB (resource block), and SRS may be configured in a tree-like structure on a per 4RB basis.

Since CS hopping is performed on the PUCCH format 0 according to a slot index and a symbol index, a CS hopping pattern needs to be shared between the base station and the UE upon UCI transmission.

The number of CSs allocable to the SRS may be differently configured depending on a SRS sequence length. For example, based on SRS allocation resource 4RB, the number of CSs may be configured to 12 if TC=4, and 8 if TC=2.

If it is configured to simultaneously transmit SRS and UCI, an UCI allocation method in periodic (P)/semi-persistent (SP) SRS resources, an UCI allocation method in aperiodic (A) SRS resources, and a configuration method of UCI simultaneous transmission regardless of SRS transmission timing may be considered depending on whether or not the number of simultaneous transmission UCI payloads and the number of payloads using PUCCH resources are distinguished.

Alternatively, simultaneously transmittable UCI payload sizes may be determined depending on transmission characteristics (e.g., P/SP/A SRS) of SRS resources to be simultaneously transmitted.

As an aperiodic SRS (i.e., A SRS) transmission timing and an aperiodic PUCCH transmission timing are differently configured, whether or not collision between PUCCH and SRS may be considered.

Hereinafter, the present disclosure proposes methods of configuring a cyclic shift (CS) so that SRS transmission and other UL transmission (e.g., UCI transmission through PUCCH) can be simultaneously performed considering the above points.

Hereinafter, Method 1) is a method of configuring a CS hopping pattern for SRS transmission and PUCCH transmission in the NR system. More specifically than the method 1), Method 2) is a method of configuring a CS hopping pattern for simultaneous transmission of SRS and PUCCH when an aperiodic PUCCH transmission timing and an aperiodic SRS transmission timing are differently configured. More specifically than the method 1), Method 3) is a method of configuring a CS hopping pattern for simultaneous transmission of SRS and PUCCH when periodic/semi-persistent SRS is transmitted, and aperiodic PUCCH is triggered via DCI.

The following methods described in the present disclosure are merely distinguished for convenience of explanation, and it is apparent that some configurations of any method can be replaced by configuration(s) of another method, and the methods can be combined with each other and applied.

Although it is described that the methods described in the present disclosure are applied in the NR system, it is apparent that the methods can be extended and applied to other wireless communication systems (e.g., LTE system, etc.).

Although it is described that the methods described in the present disclosure are described based on the simultaneous transmission of SRS and PUCCH (e.g., PUCCH for UCI transmission), it is apparent that the methods can be extended and applied even if there occurs a collision of SRS and other UL transmission than PUCCH.

Method 1)

For randomization improvement of SRS transmission interference between cells, a method may be considered which generates or defines a CS hopping pattern for port allocation of SRS resources separately from the existing considered CS hopping pattern for PUCCH transmission.

In this instance, the corresponding CS hopping pattern may be configured for each SRS resource, or configured for each SRS resource set, or configured for each UE to which SRS resources or SRS resource sets are configured. That is, the CS hopping pattern for the port allocation of SRS resources may be configured for each SRS resource, each SRS resource set, or each UE. The CS hopping pattern may be configured or indicated via signalling between the base station and the UE, or pre-defined on the system.

For example, when aperiodic SRS is configured, a CS hopping pattern may be applied for orthogonality between ports. In this instance, the CS hopping pattern may be represented by a function of symbol index and/or slot index.

In the above example, a CS value ($\alpha_{i,l}$) and a CS hopping pattern ($n_{cs}(l)$ or $n_{cs}(n_s, l)$) may be given by the following Equation 11 or 12.

$$\alpha_{i,l} = \frac{2\pi}{n_{SRS}^{cs,max}}((n_{SRS}^{cs,i} + n_{cs}(l+1')))n_{SRS}^{cs,max} \quad \text{[Equation 11]}$$

$$n_{cs}(l) = \sum_{m=0}^{7} 2^m c(8l+m)$$

$$\alpha_{i,l} = \frac{2\pi}{n_{SRS}^{cs,max}}((n_{SRS}^{cs,i} + n_{cs}(n_s, l+1')))n_{SRS}^{cs,max} \quad \text{[Equation 12]}$$

$$n_{cs}(n_s, l) = \sum_{m=0}^{7} 2^m c(N_s \cdot 8n_s + 8l + m)$$

Specifically, the Equation 11 represents the CS hopping pattern represented using the symbol index (l) and the CS value, and the Equation 12 represents the CS hopping pattern represented using the symbol index (l) and the slot index (n_s) and the CS value.

In the Equations 11 and 12, n_s denotes the slot index, l denotes the symbol index (l∈{0, 1, . . . , $N_{symb}^{SRS}$-1}), and l' denotes a first symbol index to which the SRS is transmitted. In addition, c(m) denotes a scrambling function and may be a length-31 Gold sequence, etc. Further, $n_{SRS}^{cs,i}$ may be given by the following Equation 13.

$$n_{SRS}^{cs,i} = \left(n_{SRS}^{cs} + \frac{n_{SRS}^{cs,max} p_i}{N_{ap}}\right) \bmod n_{SRS}^{cs,max}, \quad \text{[Equation 13]}$$

$$n_{SRS}^{cs} \in \{0, 1, \ldots, n_{SRS}^{cs,max}\}$$

In the Equation 13, N_ap denotes the number of SRS antenna ports.

Based on 4RB, $n_{SRS}^{cs,max}$=12 if TC=4, and $n_{SRS}^{cs,max}$=8 if TC=2.

As another example, even when periodic and/or semi-persistent SRS is configured, a CS hopping pattern may be applied for orthogonality between ports. In this instance, the CS hopping pattern may be represented by a function of symbol index and/or slot index.

In the above example, a CS value ($\alpha_{i,l}$) and a CS hopping pattern ($n_{cs}(l)$ or $n_{cs}(n_s, l)$) may be given by the following Equation 14 or 15.

$$\alpha_{i,1} = \frac{2\pi}{n_{SRS}^{cs,max}}((n_{SRS}^{cs,i} + n_{cs}(1+1')))\bmod n_{SRS}^{cs,max} \quad \text{[Equation 14]}$$

$$n_{cs}(l) = \sum_{m=0}^{7} 2^m c(8l+m)$$

$$\alpha_{i,1} = \frac{2\pi}{n_{SRS}^{cs,max}}((n_{SRS}^{cs,i} + n_{cs}(n_s, 1+1')))\bmod n_{SRS}^{cs,max} \quad \text{[Equation 15]}$$

$$n_{cs}(n_s, l) = \sum_{m=0}^{7} 2^m c(N_s \cdot 8n_s + 8l + m)$$

Specifically, the Equation 14 represents the CS hopping pattern represented using the symbol index (l) and the CS value, and the Equation 15 represents the CS hopping pattern represented using the symbol index (l) and the slot index (n_s) and the CS value.

In the Equations 14 and 15, n_s denotes the slot index, l denotes the symbol index ($l \in \{0, 1, \ldots, N_{symb}^{SRS}-1\}$), and l' denotes a first symbol index to which the SRS is transmitted. In addition, c(m) denotes a scrambling function and may be a length-31 Gold sequence, etc. Further, $n_{SRS}^{cs,i}$ may be given by the following Equation 16.

$$n_{SRS}^{cs,i} = \left(n_{SRS}^{cs} + \frac{n_{SRS}^{cs,max} p_i}{N_{ap}}\right) \bmod n_{SRS}^{cs,max}, \quad \text{[Equation 16]}$$

$$n_{SRS}^{cs} \in \{0, 1, \ldots, n_{SRS}^{cs,max}\}$$

In the Equation 16, N_ap denotes the number of SRS antenna ports. Based on 4RB, $n_{SRS}^{cs,max}=12$ if TC=4, and $n_{SRS}^{cs,max}=8$ if TC=2.

As another example, a CS hopping pattern for aperiodic, periodic and/or semi-persistent SRS may be configured by a function of slot index, symbol index and/or the number R of repetition symbols. Specifically, a CS hopping pattern based on the slot index, the symbol index and the number of repetition symbols may be represented by the following Equation 17, and a CS hopping pattern based on the symbol index and the number of repetition symbols may be represented by the following Equation 18.

$$n_{cs}(l, n_s, R) = \sum_{m=0}^{7} 2^m c\left(N_s \cdot 8n_s + 8\left\lfloor \frac{l}{R} \right\rfloor + m\right) \quad \text{[Equation 17]}$$

$$n_{cs}(l, n_s, R) = \sum_{m=0}^{7} 2^m c\left(8\left\lfloor \frac{l}{R} \right\rfloor + m\right) \quad \text{[Equation 18]}$$

Hereinafter, (particularly, if the simultaneous transmission of SRS and PUCCH is configured,) methods of configuring a CS hopping pattern for SRS and/or PUCCH are described in detail.

Method 1-1)

Considering CDM between SRS and PUCCH, a CS hopping pattern for SRS may be configured to be in linkage with a CS hopping pattern for PUCCH. Alternatively, on the contrary, considering the CDM between the SRS and the PUCCH, a CS hopping pattern for PUCCH may be configured to be in linkage with a CS hopping pattern for SRS. In this case, it may be assumed that the number of CSs configured to transmit UCI via the PUCCH is equal to the number of CSs configured for the SRS transmission, and a SRS resource length is equal to a PUCCH resource length.

In this instance, a configuration parameter (e.g., On/Off parameter) related to a linkage of the CS hopping pattern (hereinafter, referred to as "PUCCH-SRS CS linkage") may be UE-specifically configured via higher layer signaling (e.g., RRC signalling). That is, the base station may transmit, to the UE via higher layer signaling, information (e.g., parameter) for whether or not there is a relation in a CS hopping pattern between the SRS and the PUCCH.

For example, if a configuration for PUCCH-SRS CS linkage is On (e.g., value '1' of 1-bit information), it is assumed that the CS hopping pattern for SRS is configured to be associated with the CS hopping pattern for PUCCH. In this instance, the CS hopping pattern for SRS may be defined by the following Equation 19.

$$n_{SRS}^{cs}(n_{PUCCH}^{cs}) = n_{PUCCH}^{cs}(n_s, l) + \beta_0 \quad \text{[Equation 19]}$$

In the Equation 19, $n_{SRS}^{cs}(x)$ denotes the CS hopping pattern for SRS, $n_{PUCCH}^{cs}(n_s, l)$ denotes the CS hopping pattern for PUCCH, and $\beta_0$ denotes a shifted value (e.g., natural number). That is, according to the Equation 19, the CS hopping pattern for SRS may be shifting the CS hopping pattern for PUCCH by $\beta_0$. Hence, the CS hopping pattern for SRS and the CS hopping pattern for PUCCH can maintain orthogonality.

Here, $\beta_0$ may be configured via higher layer signaling (e.g., RRC signalling, MAC-CE, etc.) and/or lower layer signaling (e.g., DCI, etc.) in a UE-specific manner. Further, $\beta_0$ may be determined depending on the number of SRS ports and the number of bits of UCI to be transmitted via PUCCH (i.e., the number of bits of UCI payload).

For example, it is assumed that the maximum number of SRS ports is 4, and the number of bits of UCI is 2 bits (e.g., Quadrature Phase Shift Keying (QPSK) transmission). In this case, $\beta_0$ may be configured to $\beta_0 \in \{1, 2\}$ if a transmission comb (TC) is 4, and $\beta_0$ may be configured to $\beta_0 \in \{1\}$ if a TC is 2. Alternatively, it is assumed that the maximum number of SRS ports is 2, and the number of bits of UCI is 1 bit. In this case, $\beta_0$ may be configured to $\beta_0 \in \{1, 2, 3, 4, 5\}$ if a TC is 4, and $\beta_0$ may be configured to $\beta_0 \in \{1, 2, 3\}$ if a TC is 2.

On the contrary, as another example, if a configuration for PUCCH-SRS CS linkage is On (e.g., value '1' of 1-bit information), it is assumed that the CS hopping pattern for PUCCH is configured to be associated with the CS hopping pattern for SRS. In this instance, the CS hopping pattern for PUCCH may be defined by the following Equation 20.

$$n_{PUCCH}^{cs}(n_{SRS}^{cs}) = n_{SRS}^{cs}(n_s, l) + \beta_1 \quad \text{[Equation 20]}$$

In the Equation 20, $n_{SRS}^{cs}(n_s, l)$ denotes the CS hopping pattern for SRS, $n_{PUCCH}^{cs}(x)$ denotes the CS hopping pattern for PUCCH, and $\beta_1$ denotes a shifted value (e.g., natural number). That is, according to the Equation 20, the CS hopping pattern for PUCCH may be shifting the CS hopping pattern for SRS by $\beta_1$. Hence, the CS hopping pattern for SRS and the CS hopping pattern for PUCCH can maintain orthogonality.

Here, $\beta_1$ may be configured via higher layer signaling (e.g., RRC signalling, MAC-CE, etc.) and/or lower layer signaling (e.g., DCI, etc.) in a UE-specific manner. Further, $\beta_1$ may be determined depending on the number of SRS ports and the number of bits of UCI to be transmitted via PUCCH (i.e., the number of bits of UCI payload).

For example, it is assumed that the maximum number of SRS ports is 4, and the number of bits of UCI is 2 bits (e.g., Quadrature Phase Shift Keying (QPSK) transmission). In this case, $\beta_1$ may be configured to $\beta_1 \in \{1, 2\}$ if a transmission comb (TC) is $\beta_1$ and may be configured to $\beta_1 \in \{1\}$ if a TC is 2.

FIG. 12 illustrates an example of a method for transmitting SRS and PUCCH in a wireless communication system to which a method described in the present disclosure is applicable. FIG. 12 is merely a figure for convenience of explanation and does not limit the range of the present disclosure.

Referring to FIG. 12, if a configuration for PUCCH-SRS CS linkage is On, it assumes SRS and PUCCH transmissions based on a linkage between a CS hopping pattern for PUCCH and a CS hopping pattern for SRS. It is obvious that the method illustrated in FIG. 12 can be applied even if collision occurs between SRS and PUCCH transmissions in one UE as well as if collision occurs between SRS and PUCCH transmissions of multiple UEs.

For example, any UE(s) may be configured to perform SRS transmission and PUCCH transmission in an n-th slot. The UE(s) may be configured (or indicated) with SRS triggering through an UL grant in a (n−k2)-th slot and configured (or indicated) with PUCCH triggering in a (n−k1)-th slot. Here, k2 may correspond to a slot offset related to SRS transmission, and k1 may correspond to a slot offset related to PUCCH transmission.

As illustrated in FIG. 12, four symbols configured for SRS transmission and two symbols configured for (s)PUCCH transmission may overlap each other in resource of 12-symbol index. That is, when the PUCCH resource and the SRS resource are the same in length and location (on a frequency axis), a collision of SRS and PUCCH may occur in 12-symbol index of the n-th slot (from the base station perspective). In this case, the SRS may be generally dropped to a symbol level according to a priority rule (particularly, in case of periodic/semi-persistent SRS).

However, when the method described in the present disclosure is used, even if a configuration (or parameter) for the PUCCH-SRS CS linkage was configured to On, UE(s) with the corresponding configuration "On" may be configured to transmit PUCCH (i.e., UCI) using a PUCCH hopping pattern upon the PUCCH-SRS CS linkage. For example, when a CS value for SRS is represented by the following Equation 21, a CS value for PUCCH may be represented by the following Equation 22.

$$\alpha_{i,l} = \frac{2\pi}{n_{SRS}^{cs,max}} ((n_{SRS}^{cs,j} + n_{SRS}^{cs}(n_s, l+l'))) \mod n_{SRS}^{cs,max}) \quad \text{[Equation 21]}$$

$$\alpha_l^{PUCCH} = \frac{2\pi}{n_{SRS}^{cs,max}} ((m_{cs} + n_{PUCCH}^{cs}(n_s, l+l'))) \mod n_{SRS}^{cs,max}) \quad \text{[Equation 22]}$$

$$(n_{PUCCH}^{cs}(n_{SRS}^{cs}) = n_{SRS}^{cs}(n_s, l) + \beta_1)$$

As above, as the SRS and the PUCCH are configured with different CS values, orthogonality is established. Therefore, the base station can receive the SRS and PUCCH without collision.

In the Equation 22, if $\beta_1$=1 is configured for the UE and/or the base station via higher layer signalling, the base station may perform the decoding on SRS and PUCCH considering the CDM between SRS and PUCCH illustrated in FIG. 13.

FIG. 13 illustrates an example of a CS configuration method for SRS and PUCCH to which a method described in the present disclosure is applicable. FIG. 13 is merely a figure for convenience of explanation and does not limit the range of the present disclosure.

Referring to FIG. 13, it is assumed that the base station configures (or indicates) SRS transmission to UE 1 and configures (or indicates) PUCCH transmission to UE 2. Further, a resource length on a frequency axis of PUCCH is 1RB, and a resource length on a frequency axis of SRS is configured to 12 REs, i.e., 1RB as a TC is configured to 4.

In this instance, as $\beta_1$ is configured to 1, CS values configured to the UE 1 and CS values configured to the UE 2 have a difference of 1. Thus, the SRS transmission of the UE 1 and the PUCCH transmission of the UE 2 are configured with different CS values (i.e., CDM application).

In addition, if a configuration for PUCCH-SRS CS linkage is On, the UE may be configured not to use a PUCCH CS hopping pattern that is independently configured (i.e., configured through PUCCH dedicated configuration). The corresponding UE may also be configured not to use a parameter m_0 related to a configuration of the corresponding PUCCH CS hopping pattern. That is, if a configuration for PUCCH-SRS CS linkage is On, the UE and/or the base station may be configured not to use a CS hopping pattern (or CS hopping pattern for existing SRS) for the existing PUCCH.

On the contrary to the implementation of FIG. 12, if the configuration (or parameter) for the PUCCH-SRS CS linkage is On, a CS hopping pattern for SRS may be in linkage with a CS hopping pattern for PUCCH. In this case, when a CS value for PUCCH is represented by the following Equation 23, a CS value for SRS may be represented by the following Equation 24.

$$\alpha_l^{PUCCH} = \frac{2\pi}{N_{sc}^{RB}} ((m_0 + m_{cs} + n_{PUCCH}^{cs}(n_s, l+l')) \mod N_{sc}^{RB}) \quad \text{[Equation 23]}$$

$$\alpha_{i,l} = \frac{2\pi}{N_{sc}^{RB}} ((n_{SRS}^{cs,j} + n_{SRS}^{cs}(n_s, l+l'))) \mod N_{sc}^{RB} \quad \text{[Equation 24]}$$

$$(n_{SRS}^{cs}(n_{PUCCH}^{cs}) = m_0 + n_{PUCCH}^{cs}(n_s, l) + \beta_0)$$

Even if the CS values for SRS and PUCCH are configured as represented by Equations 23 and 24, it is obvious that the methods illustrated in FIGS. 12 and 13 can be extended and applied. Since the detailed description thereof is redundant, it will be omitted.

Method 1-2)

With regard to CS linkage configuration between SRS and PUCCH as described above, the UE may be assumed to operate as follows.

First, the UE may not expect that a CS value for SRS and a CS value for PUCCH are the same in the same symbol. That is, the base station does not equally configure a CS value for SRS and a CS value for PUCCH in the same symbol.

If a configuration for PUCCH-SRS CS linkage is On, the UE may expect that the configuration for PUCCH-SRS CS linkage is applied only in a symbol in which collision between SRS and PUCCH occurs. Alternatively, if the configuration for PUCCH-SRS CS linkage is On, the UE may expect that the configuration for PUCCH-SRS CS linkage is applied to all the allocated SRS symbols (i.e., SRS resources) and PUCCH symbols (i.e., PUCCH resources).

Method 1-3)

As mentioned above, even if the number $N_{sc}^{RB}$ of CSs for UCI transmission of independently configured PUCCH is different from the number $n_{SRS}^{cs,max}$ of CSs for SRS transmission, a configuration for PUCCH-SRS CS linkage may be considered.

In this case, if a configuration for PUCCH-SRS CS linkage is On, one of the following operations may be performed. Parameters for the following operations may be configured via higher layer signaling (e.g., RRC signalling) between the base station and the UE or pre-defined on the system.

First, the UE may be configured to drop one of SRS or PUCCH based on a priority rule. This is, in this case, the configuration for PUCCH-SRS CS linkage may be ignored.

Alternatively, in symbol(s) in which collision occurs between PUCCH and SRS, the UE may be configured to change the number of CSs for SRS transmission to the number of CSs for PUCCH (i.e., UCI) transmission and perform the configuration for PUCCH-SRS CS linkage. Alternatively, the UE may be configured to change the number of CSs for PUCCH (i.e., UCI) transmission to the number of CSs for SRS transmission and perform the configuration for PUCCH-SRS CS linkage. That is, the UE may be configured to reconfigure a CS value for PUCCH or a CS value for SRS based on the number (i.e., $N_{sc}^{RB}$ or $n_{SRS}^{cs,max}$) of CSs for one of PUCCH or SRS.

Method 1-4)

Unlike the above description, even if a length of independently configured SRS sequence and a length of PUCCH sequence are different from each other, a configuration for PUCCH-SRS CS linkage may be considered. That is, even if a resource length (on a frequency axis) of SRS and a resource length (on a frequency axis) of PUCCH are different from each other, a configuration for PUCCH-SRS CS linkage may be considered.

In this case, if the configuration for PUCCH-SRS CS linkage is On, one of the following operations may be performed. Parameters for the following operations may be configured via higher layer signaling (e.g., RRC signalling) between the base station and the UE or pre-defined on the system.

First, the UE may be configured to drop one of SRS or PUCCH based on a priority rule. This is, in this case, the configuration for PUCCH-SRS CS linkage may be ignored.

Alternatively, in symbol(s) in which collision occurs between PUCCH and SRS, the UE may be configured to change a sequence length for SRS transmission to a sequence length for PUCCH (i.e., UCI) transmission and perform a configuration for PUCCH-SRS CS linkage. In this instance, a PUCCH sequence may be configured as the applied sequence. Besides, a resource mapping method may follow a PUCCH resource mapping method. For example, a procedure to match the length of the sequence may include matching the number of CSs for SRS to the number of CSs for PUCCH and changing a CS value suitable for the corresponding number of CSs according to the pre-defined rule, etc.

Alternatively, in symbol(s) in which collision occurs between PUCCH and SRS, the UE may be configured to change a sequence length for PUCCH (i.e., UCI) transmission to a sequence length for SRS transmission and perform a configuration for PUCCH-SRS CS linkage. In this instance, a SRS sequence may be configured as the applied sequence. Besides, a resource mapping method may follow a SRS resource mapping method. For example, a procedure to match the length of the sequence may include matching the number of CSs for SRS to the number of CSs for PUCCH and changing a CS value suitable for the corresponding number of CSs according to the pre-defined rule, etc.

Method 1-5)

In operation (s) of changing one of the PUCCH sequence length and the SRS sequence length based on the other sequence length as described in the above method 1-4), the base station may transmit linkage information of SRS resource and PUCCH resource to the UE via higher layer signaling (e.g., RRC signalling) and/or DCI. In other words, the UE may receive, from the base station, linkage information of SRS resource and PUCCH resource via higher layer signaling (e.g., RRC signalling) and/or DCI.

According to the corresponding linkage information, the UE may change and map SRS resource or PUCCH resource to a PUCCH resource location or a SRS resource location that wants to change.

For example, in configuration for PUCCH sequence to use SRS sequence (i.e., configuration of changing a PUCCH sequence length for UCI transmission to a SRS sequence length), if a resource mapping method follows the SRS method, the linkage information may be configured as in Table 5.

Table 5 represents linkage configuration between SRS-PUCCH resources for PUCCH-SRS CS linkage.

TABLE 5

| SRS Resource/ PUCCH Resource Linkage Configuration Index | SRS Resource Index | PUCCH Resource Index |
| --- | --- | --- |
| 0 | 0 | 0 |
| 1 | 1 | 1 |
| 2 | 2 | 2 |
| 3 | Reserve | Reserve |

Referring to FIG. 6, information for the linkage configuration may be represented by pre-defined index(es), and each index may represent a mapping relationship between an index of SRS resource and an index of PUCCH resource.

As above, the linkage configuration between SRS resource and PUCCH resource may be configured for each SRS resource set and/or for each PUCCH resource set. The linkage configuration may be configured (or indicated) via UE-specific higher layer signaling.

That is, the base station may transmit, to the UE, information for the SRS resource/PUCCH resource linkage configuration, that is configured for each SRS resource set and/or for each PUCCH resource set, via higher layer signaling. In other words, the UE may receive, from the base station, information for the SRS resource/PUCCH resource linkage configuration, that is configured for each SRS resource set and/or for each PUCCH resource set, via higher layer signaling.

Method 2)

As described above, the method 1) corresponds to a method of configuring a CS hopping pattern for SRS transmission and PUCCH transmission in the NR system. The following method 2) describes in detail a method of configuring a hopping pattern for SRS and/or a CS hopping pattern for PUCCH considering simultaneous transmission of SRS and PUCCH when an aperiodic PUCCH transmission timing and an aperiodic SRS transmission timing are different from each other.

That is, in methods described in the following method 2), it is assumed that UE(s) is configured or indicated by a base station to transmit aperiodic PUCCH and/or aperiodic SRS, and a transmission timing of the aperiodic PUCCH and a transmission timing of the aperiodic SRS are differently configured.

The fact that the transmission timing of the aperiodic PUCCH and the transmission timing of the aperiodic SRS are differently configured may mean that an offset (hereinafter, k1) from a timing for the UE to receive DCI triggering PUCCH to a timing for the UE to perform actual PUCCH transmission and an offset (hereinafter, k2) from a timing for the UE to receive DCI triggering SRS to a timing for the UE to perform actual SRS transmission are differently configured. That is, k1 may denote the time required until the aperiodic PUCCH (i.e., A-PUCCH) is triggered to DCI and is transmitted to UL, and k2 may denote the time required until the aperiodic SRS (i.e., A-SRS) is triggered to UL grant or DL grant and is transmitted to UL.

Considering this, as illustrated in FIG. 14, a method of configuring a PUCCH-SRS CS linkage if k1 value is equal to or less than k2 value (i.e., $k_1 \le k_2$) (hereinafter, referred to as method 2-1)), and a method of configuring a PUCCH-SRS CS linkage if k2 value is less than k1 value (i.e., $k_1 > k_2$) (hereinafter, referred to as method 2-2)) are described separately.

FIG. 14 illustrates other examples of a method for transmitting SRS and PUCCH in a wireless communication system to which a method described in the present disclosure is applicable. FIG. 14 is merely a figure for convenience of explanation and does not limit the range of the present disclosure.

More specifically, (a) of FIG. 14 illustrates a method of configuring SRS and PUCCH transmissions if k1 value is equal to or less than k2 value (i.e., $k_1 \le k_2$), and (b) of FIG. 14 illustrates a method of configuring SRS and PUCCH transmissions if k2 value is less than k1 value (i.e., $k_1 > k_2$).

Method 2-1)

First, if a transmission timing offset k1 of aperiodic PUCCH is less than a transmission timing offset k2 of aperiodic SRS, the base station may transmit together, to the UE, DCI related to a configuration for PUCCH-SRS CS linkage when triggering the aperiodic PUCCH.

That is, as illustrated in (a) of FIG. 14, if k1 value configured for UE B is less than k2 value configured for UE A, the base station may transmit together, to the UE B, DCI for the PUCCH-SRS CS linkage configuration when triggering the aperiodic PUCCH. In this case, a CS value for SRS transmission of the UE A and a CS value for PUCCH transmission of the UE B may be configured based on the methods described in the present disclosure.

In this instance, if a configuration for PUCCH-SRS CS linkage is Off, the UE may not expect collision between a symbol in which the aperiodic SRS is transmitted and a symbol in which the aperiodic PUCCH is transmitted according to a priority rule.

On the other hand, if a configuration for PUCCH-SRS CS linkage is On, the following may be performed depending on whether collision between the aperiodic PUCCH and the aperiodic SRS is caused by the same UE or multiple UEs.

First, if aperiodic SRS and aperiodic PUCCH of the same UE collide with each other (e.g., UE perspective collision), DCI triggering the corresponding aperiodic PUCCH may include resource information of the aperiodic SRS colliding with the corresponding aperiodic PUCCH and linkage information between PUCCH resource and SRS resource (e.g., linkage information, etc. in the above-described method 1-5)). In other words, when the base station transmits DCI triggering the aperiodic PUCCH to the UE, the base station may transmit together resource information related to SRS causing collision, linkage information between PUCCH resource and SRS resource, etc., including them in the corresponding DCI.

For example, if the number of resources of aperiodic SRS is 4 (i.e., 2 bits) and the number of resources of aperiodic PUCCH is 8 (i.e., 3 bits) in colliding symbol(s), the base station may configure linkage information between PUCCH resource and SRS resource to 5 bits and transmit the corresponding information to the UE via DCI.

Unlike this, if aperiodic SRS and aperiodic PUCCH of different UEs collide with each other (e.g., base station perspective collision), DCI triggering the corresponding aperiodic PUCCH may include information for location, size, and/or sequence parameter of the corresponding aperiodic SRS resource, in addition to resource information of the aperiodic SRS colliding with the corresponding aperiodic PUCCH and linkage information between PUCCH resource and SRS resource (e.g., linkage information, etc. in the above-described method 1-5)). The information for the sequence parameter may contain a transmission comb (TC) for SRS, a TC offset value, and/or a root value, etc. In other words, when the base station transmits DCI triggering the aperiodic PUCCH to the UE, the base station may transmit together resource information related to SRS causing collision, linkage information between PUCCH resource and SRS resource, information related to location, size, sequence, etc. of the corresponding SRS resource, etc., including them in the corresponding DCI.

For example, if the number of resources of aperiodic SRS is 4 (i.e., 2 bits) and the number of resources of aperiodic PUCCH is 8 (i.e., 3 bits) in colliding symbol(s), the base station may configure linkage information between PUCCH resource and SRS resource to 5 bits and transmit the corresponding information to the UE via DCI. If aperiodic SRS resource #0 and aperiodic PUCCH resource #7 have a linkage relation, the linkage information may be represented as '00111' and included in the corresponding DCI.

Referring to (a) of FIG. 14, because the UE A itself cannot know a location of the allocated aperiodic SRS resource #0 from the UE B perspective, the base station may be configured to transmit, to the UE B, information for location (e.g., $(k_0,l_0)$) and size ($B_{SRS}$) of the aperiodic SRS resource #0. Hence, the UE B receiving the corresponding information can know location, size, etc. of SRS resource to be transmitted by the UE A.

Method 2-2)

First, if a transmission timing offset k2 of aperiodic SRS is less than a transmission timing offset k1 of aperiodic PUCCH, the base station may transmit together, to the UE, DCI related to a configuration for PUCCH-SRS CS linkage when triggering the aperiodic SRS.

That is, as illustrated in (b) of FIG. 14, if k2 value configured for UE B is less than k1 value configured for UE A, the base station may transmit together, to the UE B, DCI for the PUCCH-SRS CS linkage configuration when triggering the aperiodic SRS. In this case, a CS value for PUCCH transmission of the UE A and a CS value for SRS transmission of the UE B may be configured based on the methods described in the present disclosure.

In this instance, if a configuration for PUCCH-SRS CS linkage is Off, the UE may not expect collision between a symbol in which the aperiodic SRS is transmitted and a symbol in which the aperiodic PUCCH is transmitted according to a priority rule.

On the other hand, if a configuration for PUCCH-SRS CS linkage is On, the following may be performed depending on whether collision between the aperiodic PUCCH and the aperiodic SRS is caused by the same UE or multiple UEs.

First, if aperiodic SRS and aperiodic PUCCH of the same UE collide with each other (e.g., UE perspective collision), DCI triggering the corresponding aperiodic SRS may include resource information of the aperiodic PUCCH colliding with the corresponding aperiodic SRS and linkage information between SRS resource and PUCCH resource (e.g., linkage information, etc. in the above-described method 1-5)). In other words, when the base station transmits DCI triggering the aperiodic SRS to the UE, the base station may transmit together resource information related to PUCCH causing collision, linkage information between PUCCH resource and SRS resource, etc., including them in the corresponding DCI.

For example, if the number of resources of aperiodic SRS is 4 (i.e., 2 bits) and the number of resources of aperiodic PUCCH is 8 (i.e., 3 bits) in colliding symbol(s), the base station may configure linkage information between PUCCH resource and SRS resource to 5 bits and transmit the corresponding information to the UE via DCI.

Unlike this, if aperiodic SRS and aperiodic PUCCH of different UEs collide with each other (e.g., base station perspective collision), DCI triggering the corresponding aperiodic SRS may include information for location, size, and/or sequence parameter of the corresponding aperiodic PUCCH resource, in addition to resource information of the aperiodic PUCCH colliding with the corresponding aperiodic SRS and linkage information between PUCCH resource and SRS resource (e.g., linkage information, etc. in the above-described method 1-5)). The information for the sequence parameter may contain a transmission comb (TC) for PUCCH, a TC offset value, and/or a root value, etc. In other words, when the base station transmits DCI triggering the aperiodic SRS to the UE, the base station may transmit together resource information related to PUCCH causing collision, linkage information between PUCCH resource and SRS resource, information related to location, size, sequence, etc. of the corresponding PUCCH resource, etc., including them in the corresponding DCI.

For example, if the number of resources of aperiodic SRS is 4 (i.e., 2 bits) and the number of resources of aperiodic PUCCH is 8 (i.e., 3 bits) in colliding symbol(s), the base station may configure linkage information between PUCCH resource and SRS resource to 5 bits and transmit the corresponding information to the UE via DCI. If aperiodic SRS resource #0 and aperiodic PUCCH resource #7 have a linkage relation, the linkage information may be represented as '00111' and included in the corresponding DCI.

Referring to (b) of FIG. 14, because the UE A itself cannot know a location of the allocated aperiodic PUCCH resource #7 from the UE B perspective, the base station may be configured to transmit, to the UE B, information for location (e.g., ($k_7$, $l_7$)) and size ($B_{PUCCH}$) of the aperiodic PUCCH resource #7. Hence, the UE B receiving the corresponding information can know location, size, etc. of PUCCH resource to be transmitted by the UE A.

Method 3)

As described above, the method 1) corresponds to a method of configuring a CS hopping pattern for SRS transmission and PUCCH transmission in the NR system. The following method 3) describes in detail a method of configuring a hopping pattern for SRS and/or a CS hopping pattern for PUCCH considering simultaneous transmission of SRS and PUCCH when transmission of periodic or semi-persistent SRS is configured and aperiodic PUCCH is triggered via DCI. That is, in methods described in the following method 3), it is assumed that UE(s) is configured or indicated by a base station to transmit periodic/semi-persistent SRS and aperiodic PUCCH.

When aperiodic PUCCH colliding with periodic and/or semi-persistent SRS is triggered, the base station may transmit together DCI related to a configuration for PUCCH-SRS CS linkage. That is, the base station may transmit together DCI for the above-described PUCCH-SRS CS linkage configuration when triggering the corresponding aperiodic PUCCH.

In this instance, if a configuration for PUCCH-SRS CS linkage is Off, the UE may be configured to drop the SRS transmission according to a priority rule.

On the other hand, if a configuration for PUCCH-SRS CS linkage is On, the following may be performed depending on whether collision between the periodic and/or semi-persistent SRS and the aperiodic PUCCH is caused by the same UE or multiple UEs.

First, if periodic and/or semi-persistent SRS and aperiodic PUCCH of the same UE collide with each other (e.g., UE perspective collision), the UE may ignore a configuration for the PUCCH transmission receiving from the base station. Instead, the UE may be configured to select one or multiple of SRS resource(s) allocated by the base station and transmit UCI required by the base station upon triggering of the aperiodic PUCCH using CS of the selected resource(s). The selection for the SRS resource(s) may be performed depending on whether to allocate CSs in which UCI transmission is possible.

Further, the UE may transmit, to the base station, information (e.g., SRS resource indicator (SRI)) for index(es) of the corresponding SRS resource(s). The index(es) of the SRS resource(s) may be transmitted via PUCCH, or may be piggybacked and transmitted via PUCCH.

The base station may decode PUCCH and piggybacked information of PUSCH transmitted from the UE and then acquire UCI, of which transmission has been indicated via the aperiodic PUCCH, by decoding resource(s) of the corresponding SRS.

Unlike this, if periodic and/or semi-persistent SRS and aperiodic PUCCH of different UEs collide with each other (e.g., base station perspective collision), the base station may transmit together DCI related to a configuration for PUCCH-SRS CS linkage when triggering the aperiodic PUCCH colliding with the periodic or semi-persistent SRS of different UEs.

In this instance, the corresponding DCI may include resource information of the colliding periodic or semi-persistent SRS, linkage information between SRS resource and PUCCH resource (e.g., linkage information, etc. in the above-described method 1-5)), and information for location, size, and/or sequence parameter of the periodic or semi-persistent SRS resource for UCI transmission. The information for the sequence parameter may contain a transmission comb (TC) for PUCCH, a TC offset value, and/or a root value, etc. In other words, when the base station transmits DCI triggering the aperiodic PUCCH to the UE, the base station may transmit together resource information related to SRS causing collision, linkage information between PUCCH resource and SRS resource, information related to location, size, sequence, etc. of the corresponding SRS resource, etc., including them in the corresponding DCI.

The UE may be configured to acquire the DCI (i.e., the DCI triggering the aperiodic PUCCH) transmitted by the base station and then transmit UCI to the base station through periodic or semi-persistent SRS resource(s) identified based on the corresponding information. In this case, the base station can acquire UCI, that it wants to receive through the aperiodic PUCCH triggering, through the decoding for the periodic or semi-persistent SRS receiving from the UE.

The present disclosure can transmit and receive both the SRS transmission and the PUCCH transmission without dropping one of them through the methods described above even if the SRS transmission and the PUCCH transmission (i.e., UCI transmission) collide with each other in the NR system.

FIG. 15 illustrates an example of an operation flow chart of a UE transmitting a SRS in a wireless communication system to which a method described in the present disclosure is applicable. FIG. 15 is merely a figure for convenience of explanation and does not limit the range of the present disclosure.

Referring to FIG. 15, it is assumed that a UE and/or a base station transmits and receive a SRS based on the methods (e.g., method 1), method 2) and/or method 3)) described in the present disclosure.

First, the UE may receive, from the base station, configuration information for transmission of the SRS in S1505. The corresponding configuration information may be transmitted via higher layer signaling (e.g., RRC signalling, MAC-CE, etc.) and/or lower layer signaling (e.g., DCI). The corresponding configuration information may include one or more SRS resources (e.g., SRS resource set) for the transmission of the SRS, a cyclic shift (CS) hopping pattern for the SRS, CS relation information (e.g., configuration, parameter, etc. for PUCCH-SRS CS linkage) about whether or not there is a relation in a CS hopping pattern between the SRS and a PUCCH, and the like.

Next, the UE may transmit the SRS to the base station through at least one SRS resource of the one or more SRS resources in S1510. As in the above-described method (e.g., method 1)), a CS value applied to the SRS may be configured based on a CS hopping pattern for the SRS and the CS relation information.

A transmission resource of the PUCCH may be configured to overlap the at least one SRS resource in which the SRS is transmitted (e.g., configuration to perform PUCCH transmission and SRS transmission in the same symbol), and a CS value applied to the PUCCH may be configured differently from the CS value applied to the SRS. As the CS values are configured differently as described above, collision may not cause between the transmissions in the same resource.

If the CS hopping pattern for the SRS and a CS hopping pattern for the PUCCH are configured to be associated with each other based on the CS relation information (e.g., if the configuration for PUCCH-SRS CS linkage is On), the CS hopping pattern for the PUCCH may be configured as shifting the CS hopping pattern for the SRS by a certain offset. That is, as in the above-described method 1-1), the UE may convert the CS hopping pattern for the PUCCH into application of a certain offset (e.g., $\beta_1$ described above) for the CS hopping pattern for the SRS.

As described above, the certain offset may be determined based on the number of antenna ports for the SRS transmission and the number of bits of uplink control information transmitted via the PUCCH. The UE may receive the certain offset (from the base station) via UE-specific higher layer signaling.

Alternatively, if the CS hopping pattern for the SRS and the CS hopping pattern for the PUCCH are configured to be associated with each other based on the CS relation information (e.g., if the configuration for PUCCH-SRS CS linkage is On), the CS hopping pattern for the SRS may be configured as shifting the CS hopping pattern for the PUCCH by a certain offset. That is, as in the above-described method 1-1), the UE may convert the CS hopping pattern for the SRS into application of a certain offset (e.g., $\beta_0$ described above) for the CS hopping pattern for the PUCCH.

The number of CSs for the SRS may be the same as the number of CSs for the PUCCH, and a resource length on a frequency axis for the SRS transmission may be configured to be the same as a resource length on a frequency axis for the PUCCH transmission.

Alternatively, if the number of CSs for the SRS is different from the number of CSs for the PUCCH, and a sequence length for the SRS is different from a sequence length for the PUCCH, the number of CSs for the PUCCH may be converted into the number of CSs for the SRS, and the sequence length for the PUCCH may be converted into the sequence length for the SRS. That is, as in the above-described methods 1-3) and 1-4), the UE may be configured to convert the number of CSs for the PUCCH into the number of CSs for the SRS and convert the sequence length for the PUCCH into the sequence length for the SRS.

As described above, if the SRS is an aperiodic SRS, the UE may receive, from the base station, downlink control information (DCI) triggering the SRS transmission. This may be performed between the step S1505 and the step S1510. In this instance, as in the above-described method 2), if the PUCCH is an aperiodic PUCCH, and a magnitude of a transmission timing offset for the PUCCH is greater than a magnitude of a transmission timing offset for the SRS, the DCI may include information for a transmission resource of the PUCCH and/or a mapping relationship between the transmission resource of the PUCCH and a transmission resource of the SRS (e.g., linkage information in the above-described method 1-5)).

Alternatively, as in the above-described method 3), if the SRS is a periodic SRS or a semi-persistent SRS, and the PUCCH is an aperiodic PUCCH, DCI triggering the PUCCH may include information for a mapping relationship between a transmission resource of the PUCCH and a transmission resource of the SRS.

With regard to this, the above-described operation of the UE can be specifically implemented by a user equipment (UE) 1720 illustrated in FIGS. 17 and 18 of the present disclosure. For example, the above-described operation of the UE can be performed by processors 1721 and 1810 and/or RF units (or modules) 1723 and 1835.

More specifically, the processors 1721 and 1810 may be configured to receive, from a base station 1710, configuration information for transmission of a SRS through the RF units (or modules) 1723 and 1835 in S1505. The corresponding configuration information may be transmitted via higher layer signaling (e.g., RRC signalling, MAC-CE, etc.) and/or lower layer signaling (e.g., DCI). The corresponding configuration information may contain one or more SRS resources (e.g., SRS resource set) for the transmission of the SRS, a cyclic shift (CS) hopping pattern for the SRS, CS relation information (e.g., configuration, parameter, etc. for PUCCH-SRS CS linkage) about whether or not there is a relation in a CS hopping pattern between the SRS and a PUCCH, and the like.

Next, the processors 1721 and 1810 may be configured to transmit the SRS to the base station 1710 through at least one SRS resource of the one or more SRS resources through the RF units (or modules) 1723 and 1835 in S1510. As in the above-described method (e.g., method 1)), a CS value applied to the SRS may be configured based on a CS hopping pattern for the SRS and the CS relation information.

A transmission resource of the PUCCH may be configured to overlap the at least one SRS resource in which the SRS is transmitted (e.g., configuration to perform PUCCH transmission and SRS transmission in the same symbol), and a CS value applied to the PUCCH may be configured differently from the CS value applied to the SRS. As the CS values are configured differently as described above, collision may not cause between the transmissions in the same resource.

If the CS hopping pattern for the SRS and a CS hopping pattern for the PUCCH are configured to be associated with each other based on the CS relation information (e.g., if the configuration for PUCCH-SRS CS linkage is On), the CS hopping pattern for the PUCCH may be configured as shifting the CS hopping pattern for the SRS by a certain offset. That is, as in the above-described method 1-1), the processors 1721 and 1810 may be configured to convert the CS hopping pattern for the PUCCH into application of a certain offset (e.g., $\beta_1$ described above) for the CS hopping pattern for the SRS.

As described above, the certain offset may be determined based on the number of antenna ports for the SRS transmission and the number of bits of uplink control information transmitted via the PUCCH. The processors 1721 and 1810 may be configured to receive the certain offset (from the base station 1710) via UE-specific higher layer signaling through the RF units (or modules) 1723 and 1835.

Alternatively, if the CS hopping pattern for the SRS and the CS hopping pattern for the PUCCH are configured to be associated with each other based on the CS relation information (e.g., if the configuration for PUCCH-SRS CS linkage is On), the CS hopping pattern for the SRS may be configured as shifting the CS hopping pattern for the PUCCH by a certain offset. That is, as in the above-described method 1-1), the processors 1721 and 1810 may be configured to convert the CS hopping pattern for the SRS into application of a certain offset (e.g., $\beta_0$ described above) for the CS hopping pattern for the PUCCH.

The number of CSs for the SRS may be the same as the number of CSs for the PUCCH, and a resource length on a frequency axis for the SRS transmission may be configured to be the same as a resource length on a frequency axis for the PUCCH transmission.

Alternatively, if the number of CSs for the SRS is different from the number of CSs for the PUCCH, and a sequence length for the SRS is different from a sequence length for the PUCCH, the number of CSs for the PUCCH may be converted into the number of CSs for the SRS, and the sequence length for the PUCCH may be converted into the sequence length for the SRS. That is, as in the above-described methods 1-3) and 1-4), the processors 1721 and 1810 may be configured to convert the number of CSs for the PUCCH into the number of CSs for the SRS and convert the sequence length for the PUCCH into the sequence length for the SRS.

As described above, if the SRS is an aperiodic SRS, the processors 1721 and 1810 may be configured to receive, from the base station 1710, downlink control information (DCI) triggering the SRS transmission through the RF units (or modules) 1723 and 1835. This may be performed between the step S1505 and the step S1510. In this instance, as in the above-described method 2), if the PUCCH is an aperiodic PUCCH, and a magnitude of a transmission timing offset for the PUCCH is greater than a magnitude of a transmission timing offset for the SRS, the DCI may include information for a transmission resource of the PUCCH and/or a mapping relationship between the transmission resource of the PUCCH and a transmission resource of the SRS (e.g., linkage information in the above-described method 1-5)).

Alternatively, as in the above-described method 3), if the SRS is a periodic SRS or a semi-persistent SRS, and the PUCCH is an aperiodic PUCCH, DCI triggering the PUCCH may include information for a mapping relationship between a transmission resource of the PUCCH and a transmission resource of the SRS.

FIG. 16 illustrates an example of an operation flow chart of a base station receiving a SRS in a wireless communication system to which a method described in the present disclosure is applicable. FIG. 16 is merely a figure for convenience of explanation and does not limit the range of the present disclosure.

Referring to FIG. 16, it is assumed that a UE and/or a base station transmits and receive a SRS based on the methods (e.g., method 1), method 2) and/or method 3)) described in the present disclosure.

First, the base station may transmit, to the UE, configuration information for transmission of the SRS in S1605. The corresponding configuration information may be transmitted via higher layer signaling (e.g., RRC signalling, MAC-CE, etc.) and/or lower layer signaling (e.g., DCI). The corresponding configuration information may include one or more SRS resources (e.g., SRS resource set) for the transmission of the SRS, a cyclic shift (CS) hopping pattern for the SRS, CS relation information (e.g., configuration, parameter, etc. for PUCCH-SRS CS linkage) about whether or not there is a relation in a CS hopping pattern between the SRS and a PUCCH, and the like.

Next, the base station may receive the SRS from the UE through at least one SRS resource of the one or more SRS resources in S1610. As in the above-described method (e.g., method 1)), a CS value applied to the SRS may be configured based on a CS hopping pattern for the SRS and the CS relation information.

A transmission resource of the PUCCH may be configured to overlap the at least one SRS resource in which the SRS is transmitted (e.g., configuration to perform PUCCH transmission and SRS transmission in the same symbol), and a CS value applied to the PUCCH may be configured differently from the CS value applied to the SRS. As the CS values are configured differently as described above, collision may not cause between the transmissions in the same resource.

If the CS hopping pattern for the SRS and a CS hopping pattern for the PUCCH are configured to be associated with each other based on the CS relation information (e.g., if the configuration for PUCCH-SRS CS linkage is On), the CS hopping pattern for the PUCCH may be configured as shifting the CS hopping pattern for the SRS by a certain offset. That is, as in the above-described method 1-1), the base station may configure or indicate to the UE so that the UE converts the CS hopping pattern for the PUCCH into application of a certain offset (e.g., $\beta_1$ described above) for the CS hopping pattern for the SRS.

As described above, the certain offset may be determined based on the number of antenna ports for the SRS transmission and the number of bits of uplink control information transmitted via the PUCCH. The base station UE may transmit the certain offset (to the UE) via UE-specific higher layer signaling.

Alternatively, if the CS hopping pattern for the SRS and the CS hopping pattern for the PUCCH are configured to be associated with each other based on the CS relation information (e.g., if the configuration for PUCCH-SRS CS linkage is On), the CS hopping pattern for the SRS may be configured as shifting the CS hopping pattern for the PUCCH by a certain offset. That is, as in the above-described method 1-1), the base station may indicate or configure to the UE so that the UE converts the CS hopping pattern for the SRS into application of a certain offset (e.g., $\beta_0$ described above) for the CS hopping pattern for the PUCCH.

The number of CSs for the SRS may be the same as the number of CSs for the PUCCH, and a resource length on a frequency axis for the SRS transmission may be configured to be the same as a resource length on a frequency axis for the PUCCH transmission.

Alternatively, if the number of CSs for the SRS is different from the number of CSs for the PUCCH, and a sequence length for the SRS is different from a sequence length for the PUCCH, the number of CSs for the PUCCH may be converted into the number of CSs for the SRS, and the sequence length for the PUCCH may be converted into the sequence length for the SRS. That is, as in the above-described methods 1-3) and 1-4), the base station may indicate or configure to the UE so that the UE converts the number of CSs for the PUCCH into the number of CSs for the SRS and converts the sequence length for the PUCCH into the sequence length for the SRS.

As described above, if the SRS is an aperiodic SRS, the base station may transmit, to the UE, downlink control information (DCI) triggering the SRS transmission. This may be performed between the step S1605 and the step S1610. In this instance, as in the above-described method 2), if the PUCCH is an aperiodic PUCCH, and a magnitude of a transmission timing offset for the PUCCH is greater than a magnitude of a transmission timing offset for the SRS, the DCI may include information for a transmission resource of the PUCCH and/or a mapping relationship between the transmission resource of the PUCCH and a transmission resource of the SRS (e.g., linkage information in the above-described method 1-5)).

Alternatively, as in the above-described method 3), if the SRS is a periodic SRS or a semi-persistent SRS, and the PUCCH is an aperiodic PUCCH, DCI triggering the PUCCH may include information for a mapping relationship between a transmission resource of the PUCCH and a transmission resource of the SRS.

With regard to this, the above-described operation of the base station can be specifically implemented by the base station 1710 illustrated in FIG. 17 of the present disclosure. For example, the above-described operation of the base station can be performed by a processor 1711 and/or a RF unit 1713.

First, the processor 1711 may be configured to transmit, to the UE 1720, configuration information for transmission of a SRS through the RF unit 1713 in S1605. The corresponding configuration information may be transmitted via higher layer signaling (e.g., RRC signalling, MAC-CE, etc.) and/or lower layer signaling (e.g., DCI). The corresponding configuration information may contain one or more SRS resources (e.g., SRS resource set) for the transmission of the SRS, a cyclic shift (CS) hopping pattern for the SRS, CS relation information (e.g., configuration, parameter, etc. for PUCCH-SRS CS linkage) about whether or not there is a relation in a CS hopping pattern between the SRS and a PUCCH, and the like.

Next, the processor 1711 may be configured to receive the SRS from the UE 1720 through at least one SRS resource of the one or more SRS resources through the RF unit 1713 in S1610. As in the above-described method (e.g., method 1)), a CS value applied to the SRS may be configured based on a CS hopping pattern for the SRS and the CS relation information.

A transmission resource of the PUCCH may be configured to overlap the at least one SRS resource in which the SRS is transmitted (e.g., configuration to perform PUCCH transmission and SRS transmission in the same symbol), and a CS value applied to the PUCCH may be configured differently from the CS value applied to the SRS. As the CS values are configured differently as described above, collision may not cause between the transmissions in the same resource.

If the CS hopping pattern for the SRS and a CS hopping pattern for the PUCCH are configured to be associated with each other based on the CS relation information (e.g., if the configuration for PUCCH-SRS CS linkage is On), the CS hopping pattern for the PUCCH may be configured as shifting the CS hopping pattern for the SRS by a certain offset. That is, as in the above-described method 1-1), the processor 1711 may indicate or configure to the UE 1720 (through the RF unit 1713) so that the CS hopping pattern for the PUCCH is converted into application of a certain offset (e.g., $\beta_1$ described above) for the CS hopping pattern for the SRS.

As described above, the certain offset may be determined based on the number of antenna ports for the SRS transmission and the number of bits of uplink control information transmitted via the PUCCH. The processor 1711 may be configured to transmit the certain offset (to the UE 1720) via UE-specific higher layer signaling through the RF unit 1713.

Alternatively, if the CS hopping pattern for the SRS and the CS hopping pattern for the PUCCH are configured to be associated with each other based on the CS relation information (e.g., if the configuration for PUCCH-SRS CS linkage is On), the CS hopping pattern for the SRS may be configured as shifting the CS hopping pattern for the PUCCH by a certain offset. That is, as in the above-described method 1-1), the processor 1711 may indicate or configure to the UE 1720 (through the RF unit 1713) so that the CS hopping pattern for the SRS is converted into application of a certain offset (e.g., $\beta_0$ described above) for the CS hopping pattern for the PUCCH.

The number of CSs for the SRS may be the same as the number of CSs for the PUCCH, and a resource length on a frequency axis for the SRS transmission may be configured to be the same as a resource length on a frequency axis for the PUCCH transmission.

Alternatively, if the number of CSs for the SRS is different from the number of CSs for the PUCCH, and a sequence length for the SRS is different from a sequence length for the PUCCH, the number of CSs for the PUCCH may be converted into the number of CSs for the SRS, and the sequence length for the PUCCH may be converted into the sequence length for the SRS. That is, as in the above-described methods 1-3) and 1-4), the processor 1711 may indicate or configure to the UE 1720 (through the RF unit 1713) so that the UE 1720 converts the number of CSs for the PUCCH into the number of CSs for the SRS and converts the sequence length for the PUCCH into the sequence length for the SRS.

As described above, if the SRS is an aperiodic SRS, the processor 1711 may be configured to transmit, to the UE 1720, downlink control information (DCI) triggering the SRS transmission through the RF unit 1713. This may be performed between the step S1605 and the step S1610. In this instance, as in the above-described method 2), if the PUCCH is an aperiodic PUCCH, and a magnitude of a transmission timing offset for the PUCCH is greater than a magnitude of a transmission timing offset for the SRS, the DCI may include information for a transmission resource of the PUCCH and/or a mapping relationship between the transmission resource of the PUCCH and a transmission resource of the SRS (e.g., linkage information in the above-described method 1-5)).

Alternatively, as in the above-described method 3), if the SRS is a periodic SRS or a semi-persistent SRS, and the PUCCH is an aperiodic PUCCH, DCI triggering the PUCCH may include information for a mapping relationship between a transmission resource of the PUCCH and a transmission resource of the SRS.

Overview of Device to which the Present Disclosure is Applicable

FIG. 17 illustrates a block configuration diagram of a wireless communication device to which methods described in the present disclosure are applicable.

Referring to FIG. 17, a wireless communication system includes a base station 1710 and multiple UEs 1720 located in an area of the base station.

The base station 1710 includes a processor 1711, a memory 1712, and a radio frequency (RF) unit 1713. The processor 1711 implements functions, processes, and/or methods described in FIGS. 1 to 16. Layers of radio interface protocol may be implemented by the processor 1711. The memory 1712 is connected to the processor 1711 and stores various types of information for driving the processor 1711. The RF unit 1713 is connected to the processor 1711 and transmits and/or receives radio signals.

The UE 1720 includes a processor 1721, a memory 1722, and a RF unit 1723.

The processor 1721 implements functions, processes, and/or methods described in FIGS. 1 to 16. Layers of radio interface protocol may be implemented by the processor 1721. The memory 1722 is connected to the processor 1721 and stores various types of information for driving the processor 1721. The RF unit 1723 is connected to the processor 1721 and transmits and/or receives radio signals.

The memories 1512 and 1522 may be inside or outside the processors 1511 and 1521 and may be connected to the processors 1511 and 1521 through various well-known means.

For example, the UE may include a radio frequency (RF) unit transmitting and receiving a radio signal and a processor functionally connected to the RF unit in order to transmit and receive downlink data in a wireless communication system supporting a low latency service.

Further, the base station 1710 and/or the UE 1720 may have a single antenna or multiple antennas.

FIG. 18 illustrates a block configuration diagram of a communication device according to an embodiment of the present disclosure.

In particular, FIG. 18 illustrates in more detail the UE illustrated in FIG. 17.

Referring to FIG. 18, the UE may include a processor (or digital signal processor (DSP)) 1810, an RF module (or RF unit) 1835, a power management module 1805, an antenna 1840, a battery 1855, a display 1815, a keypad 1820, a memory 1830, a subscriber identification module (SIM) card 1825 (which is optional), a speaker 1845, and a microphone 1850. The UE may also include a single antenna or multiple antennas.

The processor 1810 implements functions, processes, and/or methods described in FIGS. 1 to 16. Layers of a radio interface protocol may be implemented by the processor 1810.

The memory 1830 is connected to the processor 1810 and stores information related to operations of the processor 1810. The memory 1830 may be inside or outside the processor 1810 and may be connected to the processors 1810 through various well-known means.

A user inputs instructional information, such as a telephone number, for example, by pushing (or touching) buttons of the keypad 1820 or by voice activation using the microphone 1850. The processor 1810 receives and processes the instructional information to perform an appropriate function, such as to dial the telephone number. Operational data may be extracted from the SIM card 1825 or the memory 1830. Further, the processor 1810 may display instructional information or operational information on the display 1815 for the user's reference and convenience.

The RF module 1835 is connected to the processor 1810 and transmits and/or receives a RF signal. The processor 1810 forwards instructional information to the RF module 1835 in order to initiate communication, for example, transmit a radio signal configuring voice communication data. The RF module 1835 consists of a receiver and a transmitter to receive and transmit the radio signal. The antenna 1840 functions to transmit and receive the radio signal. Upon reception of the radio signal, the RF module 1835 may forward a signal to be processed by the processor 1810 and convert the signal into a baseband. The processed signal may be converted into audible or readable information output via the speaker 1845.

FIG. 19 illustrates an example of a RF module of a wireless communication device to which a method described in the present disclosure is applicable.

More specifically, FIG. 19 illustrates an example of an RF module that can be implemented in a frequency division duplex (FDD) system.

First, in a transmission path, the processor described in FIGS. 17 and 18 processes data to be transmitted and provides an analog output signal to a transmitter 1910.

In the transmitter 1910, the analog output signal is filtered by a low pass filter (LPF) 1911 to remove images caused by a digital-to-analog conversion (ADC), is up-converted from a baseband to an RF by an up-converter (mixer) 1912, and is amplified by a variable gain amplifier (VGA) 1913. The amplified signal is filtered by a filter 1914, is additionally amplified by a power amplifier (PA) 1915, is routed through duplexer(s) 1950/antenna switch(es) 1960, and is transmitted through an antenna 1970.

Further, in a reception path, the antenna 1970 receives signals from the outside and provides the received signals, and the signals are routed through the antenna switch(es) 1960/duplexers 1950 and are provided to a receiver 1920.

In the receiver 1920, the received signals are amplified by a low noise amplifier (LNA) 1923, are filtered by a bans pass filter 1924, and are down-converted from the RF to the baseband by a down-converter (mixer) 1925.

The down-converted signal is filtered by a low pass filter (LPF) 1926 and is amplified by a VGA 1927 to obtain an analog input signal, and the analog input signal is provided to the processor described in FIGS. 17 and 18.

Further, a local oscillator (LO) generator 1940 generates transmitted and received LO signals and provides them to each of the up-converter 1912 and the down-converter 1925.

In addition, a phase locked loop (PLL) 1930 receives control information from the processor in order to generate the transmitted and received LO signals at appropriate frequencies and provides control signals to the LO generator 1940.

The circuits illustrated in FIG. 19 may be arranged differently from the configuration illustrated in FIG. 19.

FIG. 20 illustrates another example of a RF module of a wireless communication device to which a method described in the present disclosure is applicable.

More specifically, FIG. 20 illustrates an example of an RF module that can be implemented in a time division duplex (TDD) system.

A transmitter 2010 and a receiver 2020 of the RF module in the TDD system have the same structure as the transmitter and the receiver of the RF module in the FDD system.

Only the structure of the RF module of the TDD system that differs from the RF module of the FDD system will be described below, and the same structure refers to the description of FIG. 17.

A signal amplified by a power amplifier (PA) 2015 of the transmitter 2010 is routed through a band select switch 2050, a band pass filter (BPF) 2060, and antenna switch(es) 2070 and is transmitted via an antenna 2080.

Further, in a reception path, the antenna 2080 receives signals from the outside and provides the received signals, and the signals are routed through the antenna switch(es) 2070, the band pass filter 2060, and the band select switch 2050 and are provided to the receiver 2020.

In the embodiments described above, the components and the features of the present disclosure are combined in a predetermined form. Each component or feature should be considered as an option unless otherwise expressly stated. Each component or feature may be implemented not to be associated with other components or features. Furthermore, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of an implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of an implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Although the present disclosure has described a method for transmitting and receiving a sounding reference signal in a wireless communication system focusing on examples applying to the 3GPP LTE/LTE-A system and the 5G system (New RAT system), the present disclosure can be applied to various wireless communication systems other than them.

What is claimed is:

1. A method for a user equipment (UE) to transmit a sounding reference signal (SRS) in a wireless communication system, the method comprising:

receiving, from a base station, configuration information for a transmission of the SRS; and wherein the configuration information includes one or more SRS resources for the transmission of the SRS, a cyclic shift (CS) hopping pattern for the SRS, and CS relation information for the CS hopping pattern for the SRS is associated with a CS hopping pattern for a PUCCH, transmitting the SRS to the base station through at least one SRS resource of the one or more SRS resources, wherein the transmission of the SRS is performed based on a SRS sequence, wherein a group related to the SRS sequence is determined based on a SRS sequence ID which is pre-configured, wherein the SRS sequence is generated based on a specific CS value, wherein the specific CS value is determined based on i) an antenna port for the transmission of the SRS, ii) the CS hopping pattern for the SRS and iii) the CS relation information, and wherein, based on a transmission of the PUCCH overlapping with the transmission of the SRS in a time domain, the SRS is transmitted based on a code-division multiplexing (CDM), and the CDM is applied based on the specific CS value different from a CS value applied to the PUCCH.

2. The method of claim 1, wherein, based on the CS hopping pattern for the SRS and the CS hopping pattern for the PUCCH being configured to be associated with each other based on the CS relation information, the CS hopping pattern for the PUCCH is configured as shifting the CS hopping pattern for the SRS by a certain offset.

3. The method of claim 2, wherein the certain offset is determined based on a number of antenna ports for the transmission of the SRS and a number of bits of uplink control information transmitted via the PUCCH.

4. The method of claim 3, wherein the certain offset is transmitted via UE-specific higher layer signaling.

5. The method of claim 1, wherein based on the CS hopping pattern for the SRS and the CS hopping pattern for the PUCCH being configured to be associated with each other based on the CS relation information, the CS hopping pattern for the SRS is configured as shifting the CS hopping pattern for the PUCCH by a certain offset.

6. The method of claim 1, wherein a number of CSs for the SRS is the same as a number of CSs for the PUCCH, wherein a resource length on a frequency axis for the transmission of the SRS is the same as a resource length on a frequency axis for a transmission of the PUCCH.

7. The method of claim 1, wherein based on a number of CSs for the SRS being different from a number of CSs for the PUCCH, and a sequence length for the SRS being different from a sequence length for the PUCCH, the number of CSs for the PUCCH is converted into the number of CSs for the SRS, and the sequence length for the PUCCH is converted into the sequence length for the SRS.

8. The method of claim 1, further comprising, based on the SRS being an aperiodic SRS, receiving, from the base station, downlink control information (DCI) triggering the transmission of the SRS.

9. The method of claim 8, wherein, based on the PUCCH being an aperiodic PUCCH, and a magnitude of a transmission timing offset for the PUCCH being greater than a magnitude of a transmission timing offset for the SRS, the DCI includes information for a transmission resource of the PUCCH and/or a mapping relationship between the transmission resource of the PUCCH and a transmission resource of the SRS.

10. The method of claim 1, wherein based on the SRS being a periodic SRS or a semi-persistent SRS, and the PUCCH being an aperiodic PUCCH, DCI triggering the PUCCH includes information for a mapping relationship between a transmission resource of the PUCCH and a transmission resource of the SRS.

11. A user equipment (UE) transmitting a sounding reference signal (SRS) in a wireless communication system, the UE comprising:

a radio frequency (RF) unit configured to transmit and receive a radio signal; and a processor functionally connected to the RF unit, wherein the processor is configured to:

receive, from a base station, configuration information for a transmission of the SRS; and wherein the configuration information includes one or more SRS resources for the transmission of the SRS, a cyclic shift (CS) hopping pattern for the SRS, and CS relation information for whether the CS hopping pattern for the SRS is associated with a CS hopping pattern for a PUCCH, transmit the SRS to the base station through at least one SRS resource of the one or more SRS resources, wherein the transmission of the SRS is performed based on a SRS sequence, wherein a group related to the SRS sequence is determined based on a SRS sequence ID which is pre-configured, wherein the SRS sequence is generated based on a specific CS value, wherein the specific CS value is determined based on i) an antenna port for the transmission of the SRS, ii) the CS hopping pattern for the SRS and iii) the CS relation information, and wherein, based on a transmission of the PUCCH overlapping with the transmission of the SRS in a time domain, the SRS is transmitted based on a code-division multiplexing (CDM), and the CDM is applied based on the specific CS value different from a CS value applied to the PUCCH.

12. A base station receiving a sounding reference signal (SRS) in a wireless communication system, the base station comprising:

a radio frequency (RF) unit configured to transmit and receive a radio signal; and a processor functionally connected to the RF unit, wherein the processor is configured to:

transmit, to a user equipment (UE), configuration information for a transmission of the SRS; and wherein the configuration information includes one or more SRS resources for the transmission of the SRS, a cyclic shift (CS) hopping pattern for the SRS, and CS relation information for whether the CS hopping pattern for the SRS is associated with a CS hopping pattern for a PUCCH, receive the SRS from the UE through at least one SRS resource of the one or more SRS resources, wherein a transmission of the SRS is performed based on a SRS sequence, wherein a group related to the SRS sequence is determined based on a SRS sequence ID which is pre-configured, wherein the SRS sequence is generated based on a specific CS value, wherein the specific CS value is determined based on i) an antenna port for the transmission of the SRS, ii) the CS hopping pattern for the SRS and iii) the CS relation information, and wherein, based on a transmission of the PUCCH overlapping with the transmission of the SRS in a time domain, the SRS is transmitted based on a code-division multiplexing (CDM), and the CDM is applied based on the specific CS value different from a CS value applied to the PUCCH.

* * * * *